United States Patent [19]

Matsui

[11] Patent Number: 5,897,669
[45] Date of Patent: Apr. 27, 1999

[54] INFORMATION RECORDING MEDIUM FOR RECORDING MULTIMEDIA INFORMATION AS OPTICAL READABLE CODE DATA THEREON AND INFORMATION RECORDING/REPRODUCING SYSTEM USING THE SAME

[75] Inventor: Shinzo Matsui, Yamanashi-ken, Japan

[73] Assignee: Olympus Optical Co., Ltd., Tokyo, Japan

[21] Appl. No.: 08/703,368

[22] Filed: Aug. 26, 1996

[30] Foreign Application Priority Data

Sep. 20, 1995 [JP] Japan .................................. 7-241409

[51] Int. Cl.⁶ ............................... G06K 7/14; G06K 9/00
[52] U.S. Cl. ........................... 235/462; 235/460; 235/494
[58] Field of Search .................................. 235/494, 465, 235/469, 460, 462

[56] References Cited

U.S. PATENT DOCUMENTS

| | | | |
|---|---|---|---|
| 3,684,868 | 8/1972 | Christie et al. .......................... | 235/465 |
| 4,263,504 | 4/1981 | Thomas .................................... | 235/454 |
| 4,488,679 | 12/1984 | Bockholt et al. ....................... | 235/469 |
| 5,042,079 | 8/1991 | Morikawa et al. ...................... | 382/58 |
| 5,128,526 | 7/1992 | Yoshida .................................... | 235/460 |
| 5,278,400 | 1/1994 | Appel ........................................ | 235/494 |
| 5,400,415 | 3/1995 | Kobayashi ............................... | 382/51 |
| 5,420,849 | 5/1995 | Matsueda ................................ | 235/494 |
| 5,530,517 | 6/1996 | Patton et al. ............................. | 234/494 |
| 5,623,479 | 4/1997 | Takahashi ............................ | 369/275.5 |
| 5,644,557 | 7/1997 | Akamine et al. ........................ | 369/14 |
| 5,686,715 | 11/1997 | Watanabe et al. ...................... | 235/494 |
| 5,686,718 | 11/1997 | Iwai et al. ................................ | 235/494 |
| 5,724,364 | 3/1998 | Mori et al. ................................ | 371/6 |

FOREIGN PATENT DOCUMENTS

| | | | |
|---|---|---|---|
| 0670555 | 4/1994 | European Pat. Off. ............ | 369/275.5 |
| 002705480 | 11/1996 | France .................................... | 235/494 |
| 0149681 | 6/1991 | Japan ..................................... | 235/494 |
| 405174204 | 7/1993 | Japan ..................................... | 235/469 |

Primary Examiner—Anita Pellman Gross
Assistant Examiner—Douglas X. Rodriguez
Attorney, Agent, or Firm—Frishauf, Holtz, Goodman, Langer & Chick

[57] ABSTRACT

On an information recording medium, multimedia information including at least one of audio information, image information, and text data is recorded as an optical readable code. The code is constituted by arranging a plurality of blocks, and each block has a data dot pattern including a plurality of dots arranged in correspondence with the data contents, and a marker which is arranged to have a first predetermined positional relationship with respect to the data dot pattern and determines a reference position required for reading the data dot pattern. The dots of the data dot pattern and the markers are recorded on the information recording medium so that the dots, the markers, and the information recording medium have different predetermined reflectances or transmittances. More specifically, in order to reduce code redundancy, the dot code is recorded as follows. If the information recording medium is white, markers are recorded as black dots on the information recording medium, and pattern, address, and data dots are recorded so that data "1" are expressed by gray dots and data "0" are expressed by transparent dots. With this format, the markers and dots are recorded to have the same size. In this case, the data dots are not modulated. An information reproducing system reproduces a code recorded on the information recording medium, and a marker/dot separation processing unit separates markers and dots using two different threshold values.

19 Claims, 15 Drawing Sheets

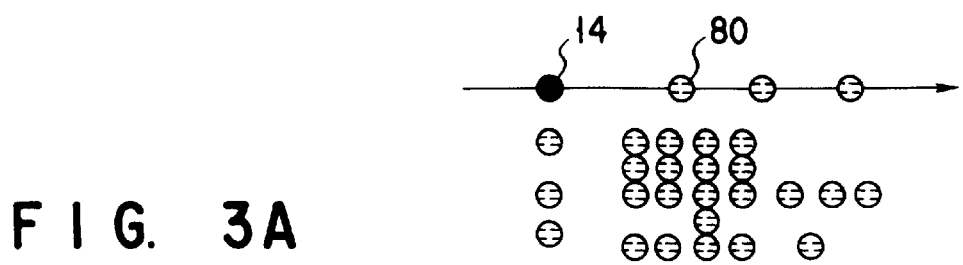
F I G. 3A
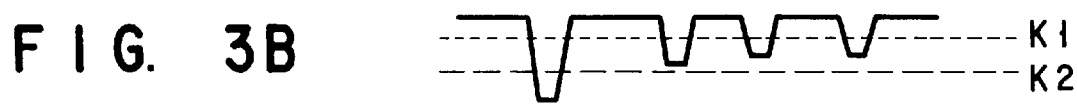
F I G. 3B
F I G. 3C
F I G. 3D
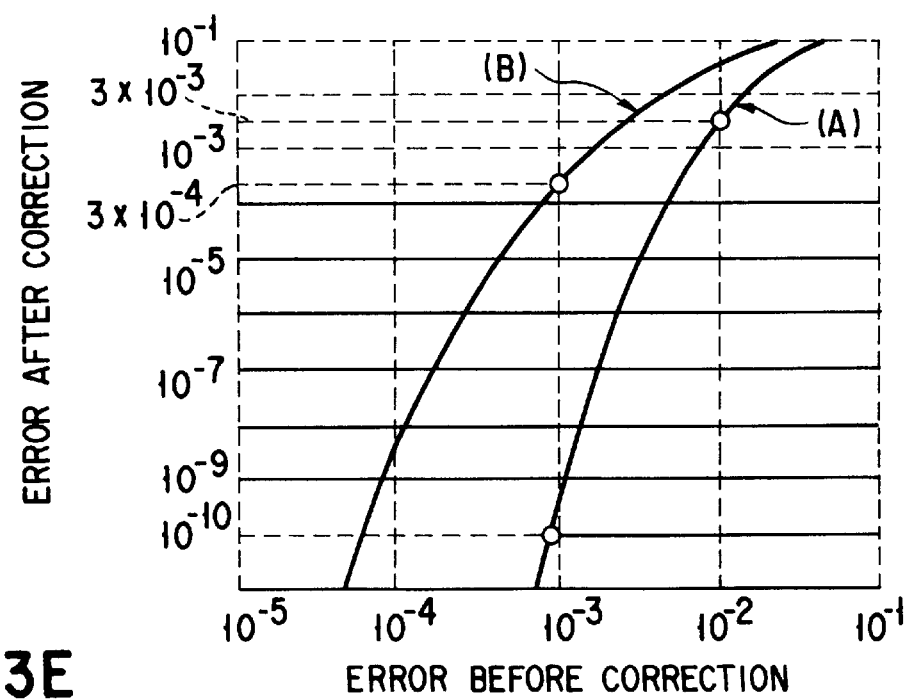
F I G. 3E

| | PRIOR ART | PRESENT INVENTION |
|---|---|---|
| TOTAL NUMBER OF DOTS/BLOCK | 1353 | 1353 |
| AUXILIARY | 173 | 73 |
| NUMBER OF DOTS IN DATA AREA | 1180 | 1280 |
| NUMBER OF EFFECTIVE DOTS | 944 | 1280 |
| REDUNDANCY | 30% | 5.4% |

BLOCK ARRANGEMENT
TOTAL NUMBER OF DOTS PER BLOCK
　41dot×33dot=1353dot
AUXILIARY AREA TOTAL NUMBER OF DOTS OF MARKER
　1dot
NUMBER OF DOTS OF PATTERN MATCHING CODE
　40dot
NUMBER OF DOTS OF BLOCK ADDRESS
　32dot
TOTAL NUMBER OF DOTS IN DATA AREA
　1280dot

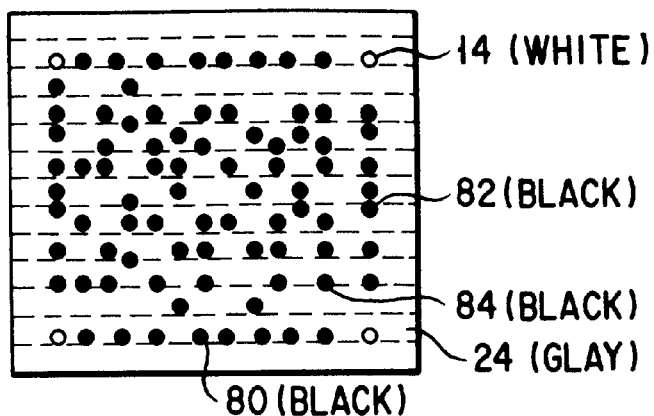
F I G. 5A
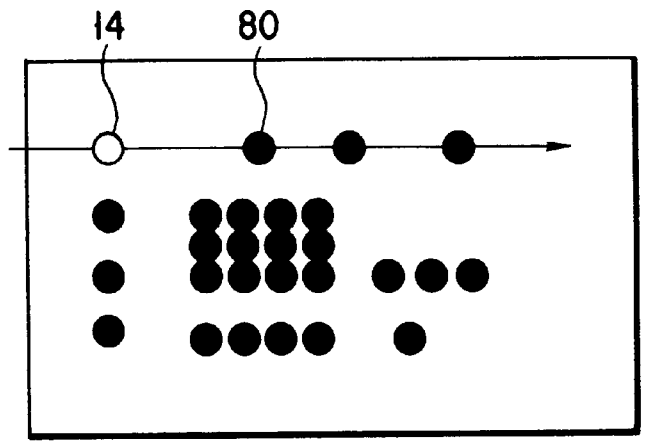
F I G. 5B
F I G. 5C
F I G. 5D
F I G. 5E

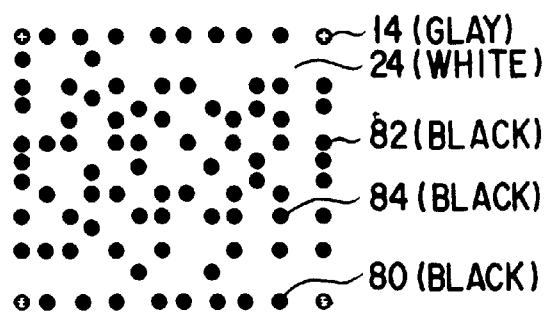
F I G. 6A
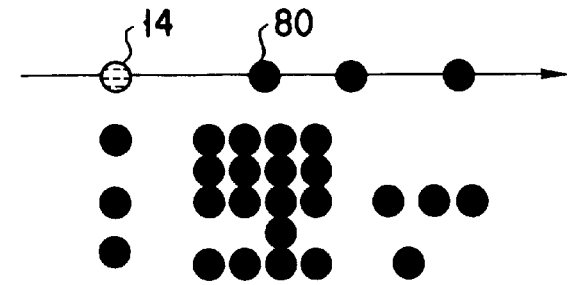
F I G. 6B
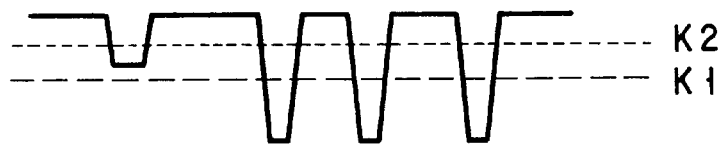
F I G. 6C
F I G. 6D
F I G. 6E
F I G. 6F
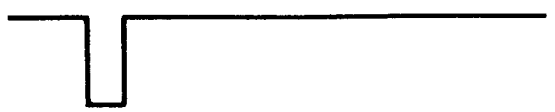
F I G. 6G

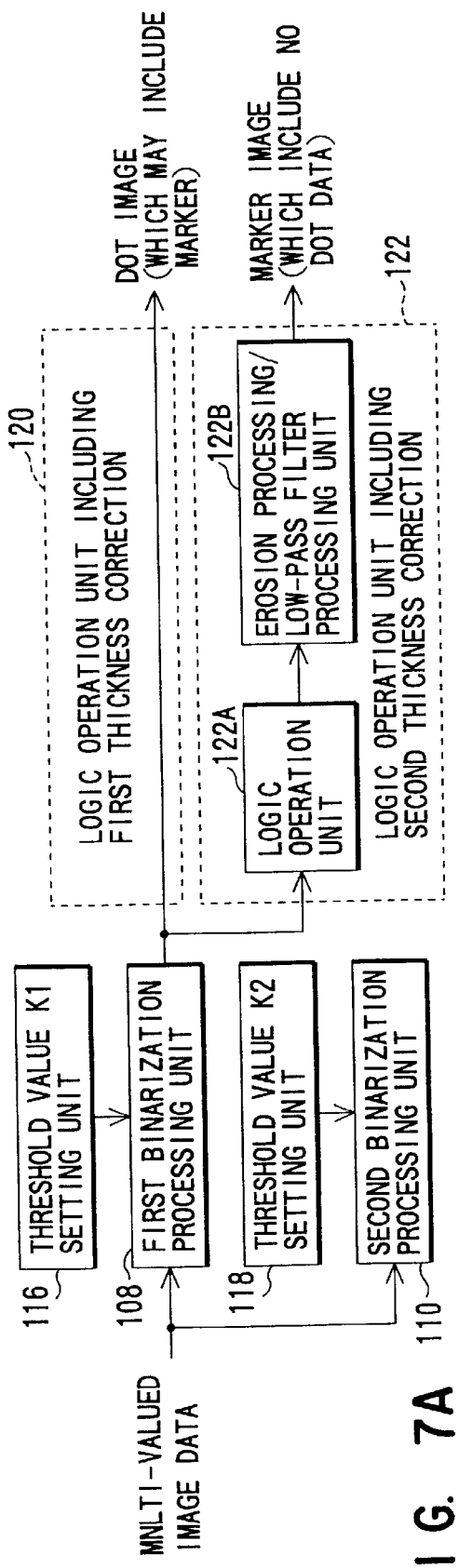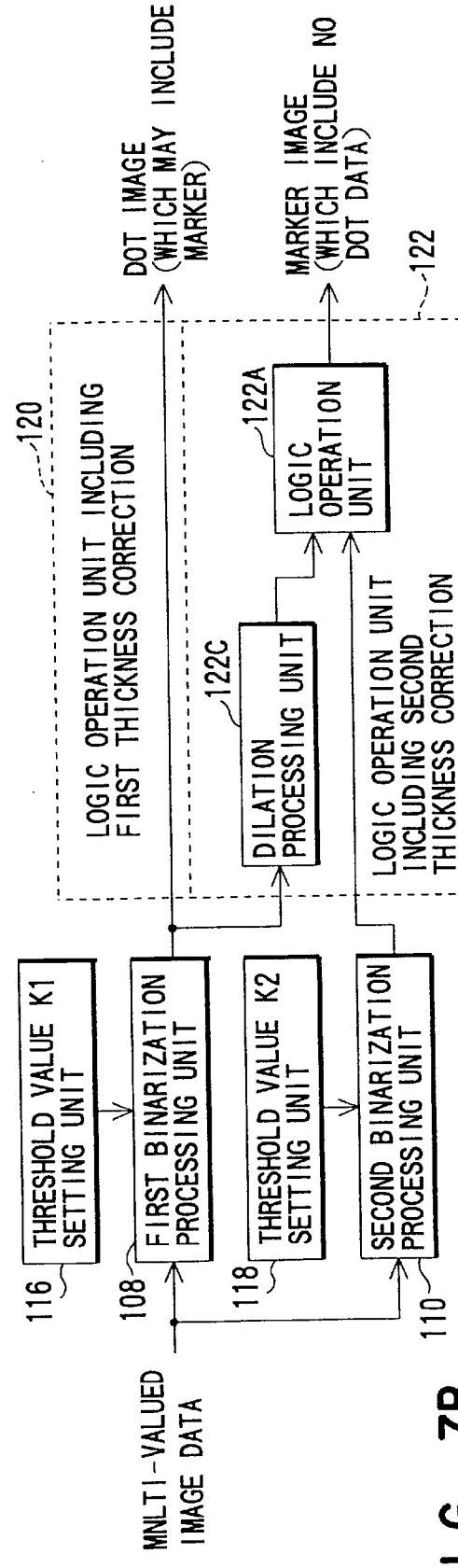
F I G. 7A
F I G. 7B

| TYPE NO. | MARKER | DATA DOT "1" | DATA DOT "0" | INFORMATION RECORDING MEDIUM |
|---|---|---|---|---|
| 1 | ○ | ○ | □ | ◎ |
| 2 | ● | ○ | ◎ | □ |
| 3 | ● | □ | ○ | ◎ |
| 4 | ● | □ | ◎ | ○ |
| 5 | ● | ◎ | □ | ○ |
| 6 | ● | ◎ | ○ | □ |
| 7 | ○ | ● | □ | ◎ |
| 8 | ○ | ● | ◎ | □ |
| 9 | ○ | □ | ● | ◎ |
| 10 | ○ | □ | ◎ | ● |
| 11 | ○ | ◎ | □ | ● |
| 12 | ○ | ◎ | ● | □ |
| 13 | □ | ○ | ● | ◎ |
| 14 | □ | ○ | ◎ | ● |
| 15 | □ | ● | ○ | ◎ |
| 16 | □ | ● | ◎ | ○ |
| 17 | □ | ◎ | ● | ○ |
| 18 | □ | ◎ | ○ | ● |
| 19 | ◎ | ○ | ● | □ |
| 20 | ◎ | ○ | □ | ● |
| 21 | ◎ | ● | ○ | □ |
| 22 | ◎ | ● | □ | ○ |
| 23 | ◎ | □ | ● | ○ |
| 24 | ◎ | □ | ○ | ● |

○ : HIGH REFLECTANCE (WHITE)

● : LOW REFLECTANCE (BLACK)

◎ : MIDDLE REFLECTANCE (GRAY)

□ : TRANSPARENT

F I G. 8

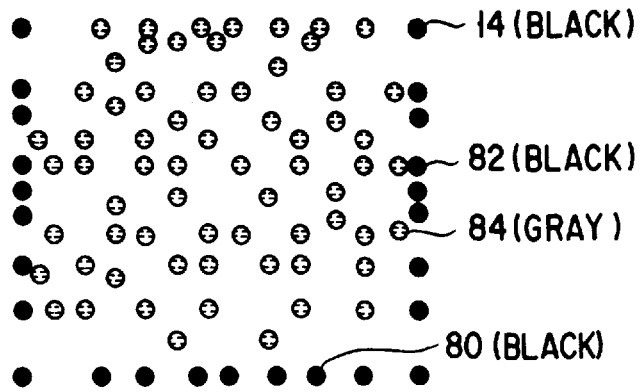
F I G. 10A
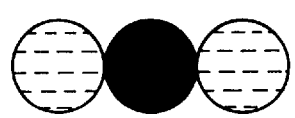
F I G. 10B
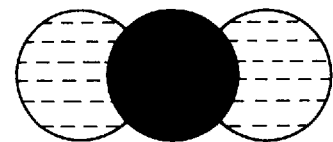
F I G. 10C
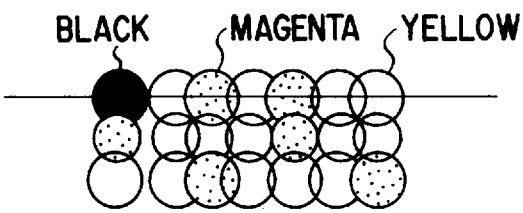
F I G. 11A
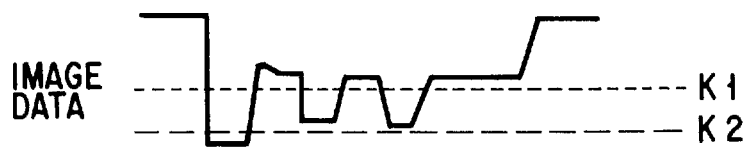
F I G. 11B
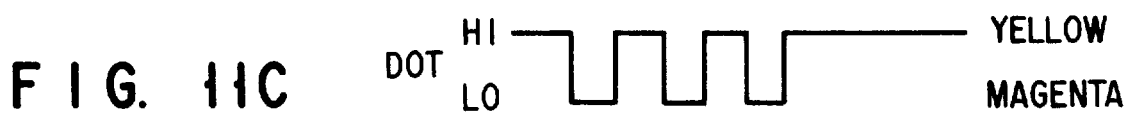
F I G. 11C
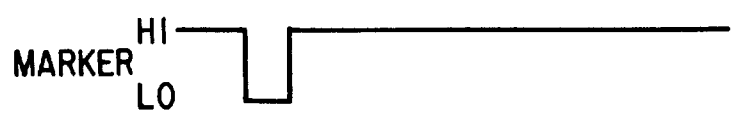
F I G. 11D

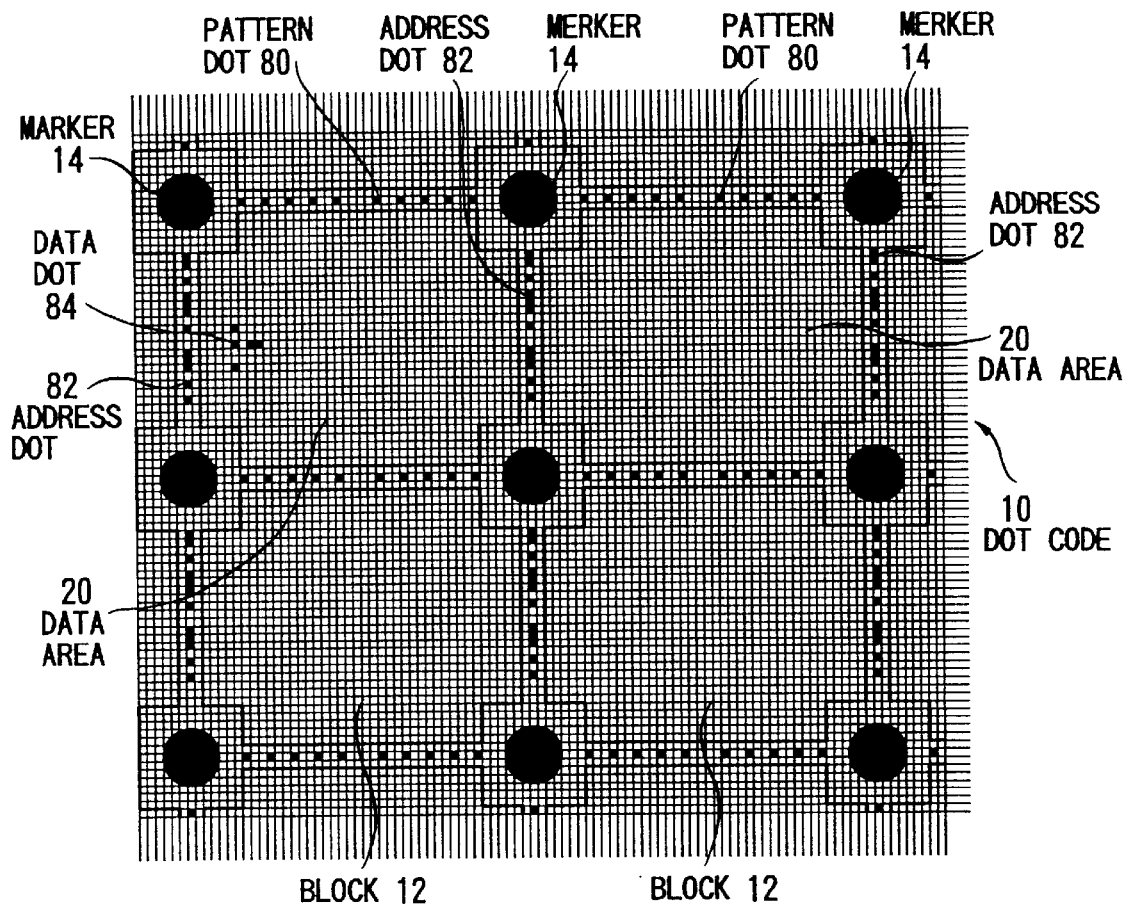
F I G. 14
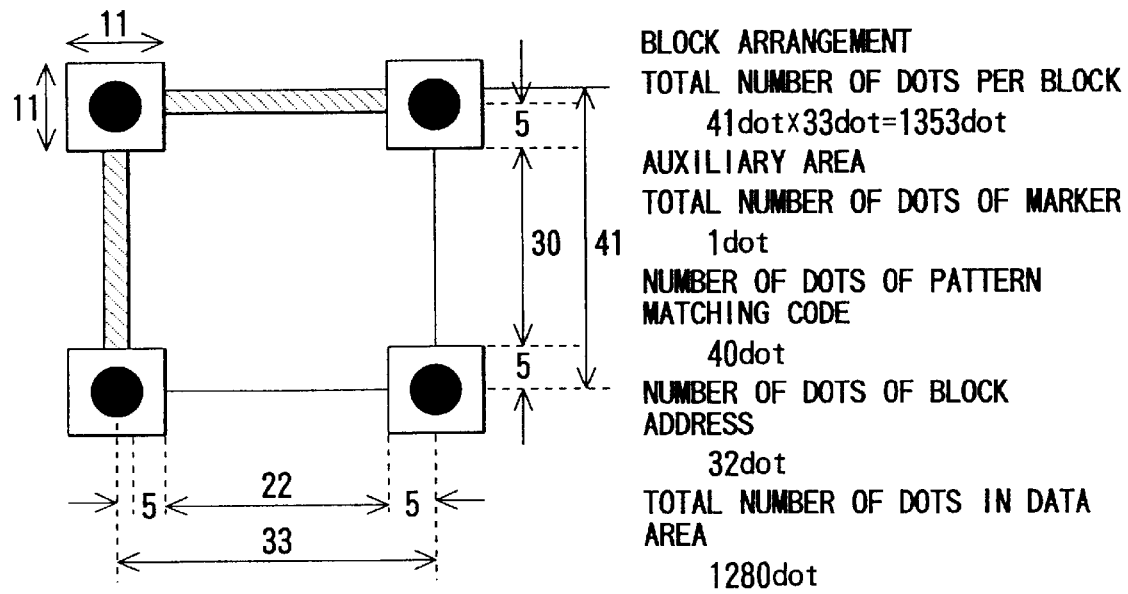
F I G. 15

INFORMATION RECORDING MEDIUM FOR RECORDING MULTIMEDIA INFORMATION AS OPTICAL READABLE CODE DATA THEREON AND INFORMATION RECORDING/REPRODUCING SYSTEM USING THE SAME

BACKGROUND OF THE INVENTION

1. Field of the Invention

The present invention generally relates to an information recording medium for recording multimedia information as optical readable code data thereon and an information recording/reproducing system using the same and, more particularly, to an information recording medium such as a paper sheet on which so-called multimedia information including audio information such as a voice, music, or the like, image information obtained from a camera, video equipment, or the like, and/or text data obtained from a personal computer, a wordprocessor, or the like, is recorded as an optical readable code pattern, an information reproducing system for optically reading the code pattern from such information recording medium and reproducing original multimedia information, and an information recording system for recording the code pattern on the information recording medium.

2. Description of the Related Art

As conventional information recording media for recording audio information such as a voice, music, and the like, various kinds of media such as a magnetic tape, an optical disk, and the like are known.

However, these information recording media have relatively high prices even when their copies are mass-produced, and generally require a large area for storage.

Furthermore, for example, the need for forwarding an information recording medium that records voice data to another person at a remote place requires much labor and time even when the medium is forwarded via mail or is directly carried.

The same problems apply to all kinds of so-called multimedia information including video information obtained from a camera, video equipment, and the like, and digital code data obtained from a personal computer, wordprocessor, and the like in addition to audio information.

In view of these problems, U.S. Ser. No. 08/407,018 (EP0670555A1) assigned to the assignee of the present application discloses a system for recording multimedia information including at least one of audio information, video information, and text data on an information recording medium such as a paper sheet in the form of a two-dimensional code pattern, defined by two-dimensionally arranging a plurality of dots, as image information which allows facsimile transmission and can be copied in a large quantity with low cost, i.e., code information, and a system for reproducing the code information recorded on the medium.

FIG. 12 shows the format of a dot code as a two-dimensional code pattern disclosed in U.S. Ser. No. 08/407,018 (EP0670555A1).

More specifically, in a dot code 10, one block 12 consists of a marker 14, a block address 16, error detection/correction data 18 for an address, and a data area 20 that stores actual data.

A large number of blocks 12 are arranged two-dimensionally (in the vertical and horizontal directions), and the dot code 10 is formed by a group of blocks 12.

Note that the marker 14 is a large black dot having a diameter of seven dots (seven data dots).

FIG. 13A shows the schematic arrangement of an information reproducing system which is disclosed in U.S. Ser. No. 08/407,018, and reproduces and outputs original multimedia information by reading the above-mentioned dot code 10.

More specifically, in this information reproducing system, a light source 22 illuminates the dot code 10 recorded on a sheet 24 serving as a recording medium, and light reflected by the dot code 10 is detected as an image signal by an image pickup unit 28 comprising, e.g., a charge-coupled device (CCD), a charge-modulated device (CMD), or the like for converting optical information into an electrical signal, via an imaging optical system 26 such as a lens. The detected image signal is amplified by a pre-amplifier 30, and the amplified signal is output.

Note that the light source 22, the imaging optical system 26, the image pickup unit 28, and the pre-amplifier 30 are arranged in an external light shielding unit 32, so as to prevent disturbance caused by external light.

The image signal amplified by the pre-amplifier 30 is binarized by a binarization circuit 34, and the binary image data is stored in an image memory 36.

Note that the image pickup unit 28 is controlled by an image pickup unit control unit 38.

For example, when the image pickup unit 28 comprises an interline transfer type CCD, the image pickup unit control unit 38 outputs, as control signals of the image pickup unit 28, a V blank signal for vertical synchronization, an image pickup element reset pulse signal for resetting an information charge, a charge transfer gate pulse signal for transferring charges accumulated on two-dimensionally arranged charge transfer/storage units to a plurality of vertical shift registers, a horizontal charge transfer CLK signal serving as a transfer clock signal for a horizontal shift register for transferring a charge in the horizontal direction and outputting it to an external device, and a vertical charge transfer pulse signal for transferring, in the vertical direction, charges of the plurality of vertical shift registers to the horizontal shift register, and the like.

The image pickup unit control unit 38 supplies, to the light source 22, a light-emitting cell control pulse used for defining the light-emission timing of the light source 22 in synchronism with the control timing of the image pickup unit 28.

The image data stored in the image memory 36 is temporarily read out, and the read-out data is supplied to a marker detection unit 40 including marker extraction.

The marker detection unit 40 detects markers 14 in units of blocks 12 of the dot code 10.

The marker extraction and detection of the marker detection unit 40 can be attained by erosion processing described in U.S. Ser. No. 08/571,776 (EP0717398A1) assigned to the assignee of the present application.

A data arrangement direction detection unit 42 detects the data arrangement direction, i.e., the skew, rotation, and direction of the dot code 10 recorded on the sheet 24 as a recording medium using the markers 14 extracted and detected by the marker detection unit 40.

A block address detection unit 44 detects block addresses on the basis of the data arrangement direction of the dot code 10 detected by the data arrangement direction detection unit 42, and also detects the true centers of the markers 14.

An address control unit 46 generates read addresses for the image memory 36 in accordance with the block addresses detected by the block address detection unit 44 and data dot reading points in the data areas 20 of the respective blocks 12 based on the true centers of the markers 14.

Therefore, the image data read out from the image memory 36 in accordance with the read addresses generated by the address control unit 46 represents a data dot pattern.

Since the dot code 10 read out from the image memory 36 is modulated (e.g., by 8–10 modulation) upon recording, the dot code 10 is subjected to 10–8 demodulation in a demodulation unit 48, and the demodulated data is input to a data memory unit 50.

Thereafter, the data read out from the data memory unit 50 is subjected to de-interleave processing in a de-interleave unit 52, and the processed data is then subjected to error correction in units of bytes in a data error correction unit 54.

The corrected data is subjected to expansion processing corresponding to compression processing executed upon recording, and the expanded data is then reproduced and output.

More specifically, when the data is multi-valued image information such as a natural image, for example, expansion processing corresponding to JPEG is performed, or when the data is binary image information such as handwritten characters, a graph, or the like, expansion processing corresponding to MR, MH, MMR, or the like is performed. On the other hand, as for characters and line images, the data is subjected to processing such as Huffman or Ziv-Lempel processing. Thereafter, the processed data is converted into display data. After the display data is converted into an analog signal, the signal is displayed on a display device such as a CRT (television monitor), an FMD (face-mounted display), or the like.

Note that the FMD is a spectacle-type monitor (handy monitor) to be worn on a user's face, and is effective for, e.g., virtual reality applications, and when an image requiring a large screen is observed in a limited place.

Audio information is subjected to expansion processing corresponding to, e.g., ADPCM, and after the processed data is converted into an analog signal, the analog audio signal is output to an audio output device such as a loudspeaker, a headphone, or the like.

Of course, the character or line image data may be directly output to a page printer, plotter, or the like. That is, the character data may be printed on a paper sheet as characters by, e.g., a wordprocessor, or the line image data can be output by a plotter as a drawing or the like.

FIG. 13B shows the schematic arrangement of an information recording system which is disclosed in U.S. Ser. No. 08/407,018 (EP0670555A1), and records the dot code 10.

More specifically, in this information recording system, a multimedia information input unit 58 (such as a microphone, an audio equipment, a camera, a video equipment, a personal computer, a wordprocessor, or the like) inputs digital multimedia information such as audio information, image information, text data, or the like, and the input multimedia information is supplied to a compression processing unit 60.

The compression processing unit 60 performs appropriate compression processing for the supplied multimedia information, and synthesizes compressed data as needed.

For example, the compression processing unit 60 performs ADPCM processing for audio information; compression such as Huffman, arithmetic, Ziv-Lempel, or the like for text data; general binary compression processing such as MR, MH, MMR, or the like represented by JBIG for binary image information; or still image compression processing such as DPCM, JPEG, or the like for multi-valued image information.

An error correction code is added to the compressed data by an error correction code addition unit 62, and the data is input to a data memory unit 64.

The data memory unit 64 stores the data, and thereafter, an interleave processing unit 66 performs interleave processing.

In the interleave processing, continuous data strings are appropriately distributed to separate positions so as to eliminate errors as much as possible, e.g., to improve correction performance by eliminating block errors caused by noise or the like as much as possible, when the data is recorded as an actual dot code and is reproduced.

That is, in this processing, the danger of making error correction impossible is reduced by confining generation of burst errors to generation of an error for one correction unit.

The interleaved data is subjected to, e.g., 8–10 modulation in a modulation circuit 68, and the modulated data is converted into image data, in which data "1" is represented by a black dot and data "1" is represented by a white dot, in a block dot image conversion unit 70.

At this time, a data addition unit 72 adds markers, block addresses, address error discrimination codes (CRC or the like) to the image data.

Note that the markers form a data string falling outside the range of 256 different data strings that are obtained by modulation using the modulation circuit 68. Since the markers are added after modulation, the markers can be prevented from being modulated, i.e., being hardly recognized as markers.

The image data added with data is supplied to a synthesis processing unit 74, and is synthesized with print information (an image, title, characters, and the like to be recorded on a medium) other than the generated data from a print information input unit 76. The synthesized data is converted into an output format to a printer or a data format corresponding to print plate making, and the converted data is supplied to a printer system/print plate making system 78.

The printer system/print plate making system 78 finally prints the data on a recording medium such as a sheet, a tape, a printed matter, or the like.

As disclosed in U.S. Ser. No. 08/571,776 (EP0717398A1) assigned to the assignee of the present application, a format that can improve the recording density of the above-mentioned dot code has been developed.

In this format, as shown in FIG. 14, predetermined matching pattern dots 80 are arranged at predetermined positions with respect to each marker 14, e.g., between adjacent markers in a first direction, and address dots 82 indicating block addresses are arranged at predetermined positions with respect to each marker 14, e.g., between adjacent markers in a second direction.

The pattern dot 80 and the address dot 82 are constituted by dots each having the same size as a data dot arranged in a data area 20.

In such dot code 10, since the arrangement direction and the true centers of the markers 14 serving as reading reference points of the data dots 84 can be detected using the pattern dots 80 having a predetermined pattern, the reading reference points can be easily and accurately detected.

Therefore, according to the format disclosed in U.S. Ser. No. 08/571,776 (EP0717398A1), even when a code pattern is recorded at a high density, the positions of data dots 84 can be calculated with high accuracy, and original multimedia information can be reliably reproduced.

In the dot code with the format shown in FIG. 14, each marker 14 is a large black dot having a diameter of 7 dots, as described above, and a blank portion (white area) is assured around the marker 14, as shown in FIG. 15. Therefore,.each marker 14 requires a size of 11 dots×11 dots including the white area.

On the other hand, the pattern dots 80 are arranged in an area of 1 dot×30 dots to have a predetermined pattern, and the address dots 82 are arranged in an area of 22 dots×1 dot.

In the horizontal direction, five dots are required from the position of the pattern dots 80 to the edge of the white area of the marker 14, 22 dots are required from the edge of the white area of the marker to that of the next marker, and another five dots are required from the edge of the white area of the next marker to the position of the pattern dots of a neighboring block. Therefore, the total number of dots in the horizontal direction of one block is 33.

In the vertical direction, five dots are required from the position of the address dots 82 to the edge of the white area of the marker, 30 dots are required from the edge of the white area of the marker to that of the next lower marker, and another five dots are required from the edge of the white area to the position of the address dots of the next lower block. Therefore, the total number of dots in the vertical direction of one block is 41.

Therefore, the total number of dots per block, i.e., the area occupied by one block, is 33 dots×41 dots=1,353 dots.

However, of the 1,353 dots, the actual data area 20 corresponds to a portion from which the markers 14, the pattern dots 80, and the address dots 82 are excluded. For this reason, the data area 20 has only a size of 1,180 dots excluding 121 dots+30 dots+22 dots.

Since data to be recorded on this data area 20 is subjected to 8–10 modulation as described above, the number of actually effective dots is 944.

Therefore, 409 dots=1,353 dots (the total number of dots per block)−944 dots (the number of effective dots) are redundant dots, resulting in a redundancy of 30% (=409/1,353).

SUMMARY OF THE INVENTION

It is, therefore, an object of the present invention to provide a new and improved information recording medium for recording multimedia information as optical readable code data and an information recording/reproducing system using the same, i.e., an information recording medium which can reduce the redundancy of a code and which can record multimedia information on a small recording area as much as possible, an information recording system for recording much multimedia information on such information recording medium, and an information reproducing system capable of accurately reproducing original multimedia information from the information recording medium.

In order to achieve the above object, according to the present invention, there is provided an information recording medium on which multimedia information including at least one of audio information, image information, and text data is recorded as an optical readable code, characterized in that the code is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, and the dots of the data dot pattern and the markers are recorded on the information recording medium so that the dots, the markers, and the information recording medium have different predetermined reflectances or transmittances.

More specifically, according to the information recording medium of the present invention, since markers and dots are recorded so that the markers, the dots, and the information recording medium have different predetermined reflectances or transmittances, when a recorded code is optically read, the markers, the dots, and the information recording medium can be easily separated from each other on the basis of their reflected light amounts or transmitted light amounts, the area required for each marker can be reduced, and the need for modulation can be obviated, thus increasing the ratio of data in the code recorded area.

According to the present invention, there is also provided an information reproducing system which comprises reading means for reading, from an information recording medium on which multimedia information including at least one of audio information, image information, and text data is recorded as an optical readable code, the code by optical scanning, processing means for restoring the multimedia information by processing the code read by the reading means, and output means for reproducing and outputting the information on the basis of an output signal from the processing means, characterized in that the code recorded on the information recording medium is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, and the processing means comprises separation means for separating the marker using first and second threshold values so as to discriminate the dots of the data dot pattern, the marker, and the information recording medium from each other from the code read by the reading means.

More specifically, according to the information reproducing system of the present invention, in the processing means for restoring multimedia information by processing a code read by optically scanning the code recorded on an information recording medium on which markers and dots are recorded so that the markers, the dots, and the information recording medium have different predetermined reflectances or transmittances, the separation means separates the markers using the first and second threshold values.

Therefore, according to the information reproducing system of the present invention, a low-cost, space-saving apparatus which can easily separate dots and markers can be realized.

According to the present invention, there is also provided an information reproducing system which comprises reading means for reading, from an information recording medium on which multimedia information including at least one of audio information, image information, and text data is recorded as an optical readable code, the code by optical scanning, processing means for restoring the multimedia information by processing the code read by the reading means, and output means for reproducing and outputting the information on the basis of an output signal from the processing means, characterized in that the code is a non-modulated code, and the processing means performs error correction processing in units of predetermined numbers of bits.

More specifically, according to the information reproducing system of the present invention, since the processing means performs error correction processing in units of predetermined numbers of bits, the following code can be reproduced. That is, the code is constituted by arranging a plurality of blocks, each block has a data dot pattern including a plurality of dots arranged in correspondence with the data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, the data dot pattern is a non-modulated code, and error correction codes are added in units of predetermined numbers of bits. Also, the error correction performance against random errors caused by deformation of dots upon recording (e.g., printing) can be improved, and hence, the reproduction probability can be improved.

According to the present invention, there is also provided an information recording system which comprises input means for inputting multimedia information including at least one of audio information, image information, and text data, conversion means for converting the multimedia information input by the input means into an optical readable code, and recording means for recording the code converted by the conversion means on an information recording medium so as to be optically readable, and in which the code is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, and the dots of the data dot pattern and the markers are recorded on the information recording medium so that the dots, the markers, and the information recording medium have different predetermined reflectances or transmittances, characterized in that the conversion means comprises means for adding error correction codes in units of predetermined numbers of bits upon conversion of the multimedia information into the optical readable code, and data added with the error correction codes is non-modulated data.

More specifically, according to the information recording system of the present invention, upon conversion of multimedia information into an optical readable code by the conversion means, error correction codes are added in units of predetermined numbers of bits, and data after the error correction codes are added is non-modulated data, thus allowing recording of the following code. That is, the code is constituted by arranging a plurality of blocks, each block has a data dot pattern including a plurality of dots arranged in correspondence with the data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, the data dot pattern is a non-modulated code, and error correction codes are added in units of predetermined numbers of bits.

According to the present invention, there is also provided an information recording system which comprises input means for inputting multimedia information including at least one of audio information, image information, and text data, conversion means for converting the multimedia information input by the input means into an optical readable code, and recording means for recording the code converted by the conversion means on an information recording medium so as to be optically readable, and in which the code is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, and the dots of the data dot pattern and the markers are recorded on the information recording medium so that the dots, the markers, and the information recording medium have different predetermined reflectances or transmittances, characterized in that the recording means comprises means for selecting colors or densities to be recorded on the information recording medium in correspondence with type information of the code and information associated with the information recording medium.

More specifically, according to the information recording system of the present invention, since the recording means records a code by selecting the color or density to be recorded on the information recording medium in accordance with the type information of the code or information associated with the information recording medium, the following code can be recorded. That is, the code is constituted by arranging a plurality of blocks, each block has a data dot pattern including a plurality of dots arranged in correspondence with the data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, the data dot pattern is a non-modulated code, and error correction codes are added in units of predetermined numbers of bits. Also, the recording colors of the markers and dots can be selected in accordance with a recording machine such as a printer or a printing press, its print conditions, and the information recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A to 3D are views for explaining the operation of the marker/dot separation processing unit shown in FIG. 2A;

FIG. 3E is a graph for explaining the error performance of error correction processing of a bit unit error correction unit in FIG. 1B;

FIG. 5A is a view showing the format of a dot code according to the second embodiment of the present invention;

FIGS. 5B to 5E are views for explaining the operation of a marker/dot separation processing unit in the second embodiment of the present invention;

FIG. 6A is a view showing the format of a dot code according to the third embodiment of the present invention;

FIGS. 6B to 6G are views for explaining the operation of a marker/dot separation processing unit in the third embodiment of the present invention;

FIGS. 7A and 7B are block diagrams showing the arrangement of the marker/dot separation processing unit in the third embodiment of the present invention;

FIG. 8 is a table showing combinations of the reflectances of markers, data dots "1" and "0", and a recording medium in a plurality of types of dot codes;

FIG. 10A is a view showing the format of a dot code according to the fifth embodiment of the present invention;

FIGS. 10B and 10C are views for explaining swelling of dots;

FIG. 11A is a view showing the format of a dot code according to the sixth embodiment of the present invention;

FIGS. 11B to 11D are views for explaining the operation of a marker/dot separation processing unit in the sixth embodiment of the present invention;

FIG. 14 is a view showing another format of the dot code of the previous application; and FIG. 15 is a view for explaining the size of a block in the dot code with the format shown in FIG. 14.

DETAILED DESCRIPTION OF THE PREFERRED EMBODIMENTS

Figure 1A:
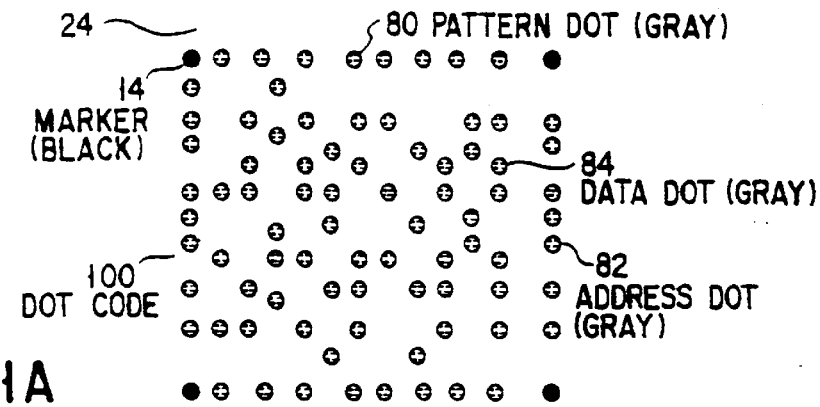
FIG. 1A is a view showing the format of a dot code according to the first embodiment of the present invention.

Reference will now be made in detail to the presently preferred embodiments of the invention as illustrated in the accompanying drawings, in which like reference characters designate like or corresponding parts through out the several drawings.

The preferred embodiments of the present invention will be described hereinafter with reference to the accompanying drawings.

In the following description, the same reference numerals used in the above description of FIGS. 12 to 15 denote the same parts as those disclosed in U.S. Ser. No. 08/407,018 (EP0670555A1), and U.S. Ser. No. 08/571,776 (EP0717398A1) as the previous applications assigned to the assignee of the present application, and a detailed description thereof will be omitted.

FIG. 1A shows the format of a dot code 100 to be recorded on an information recording medium, i.e., a sheet 24 according to the first embodiment of the present invention.

In this embodiment, since markers 14, pattern dots 80, address dots 82, and data dots 84 are recorded to have different predetermined reflectances or transmittances as well as the information recording medium, i.e., the sheet 24, the markers 14, the pattern dots 80, the address dots 82, and the data dots 84 are recorded as dots having the same size.

More specifically, the information recording medium, i.e., the sheet 24 is white, the markers 14 are recorded as black dots on the information recording medium, i.e., the sheet 24, and the pattern, address, and data dots 80, 82, and 84 are recorded so that data "1" is expressed by a gray dot, and data "0" is expressed by a transparent dot.

In this case, the data dots 84 are not modulated (e.g., 8–10 modulation) unlike in the previous application (U.S. Ser. No. 08/571,776, EP0717398A1), and are obtained by simply converting an original binary data string into dot images.

Figure 1B:
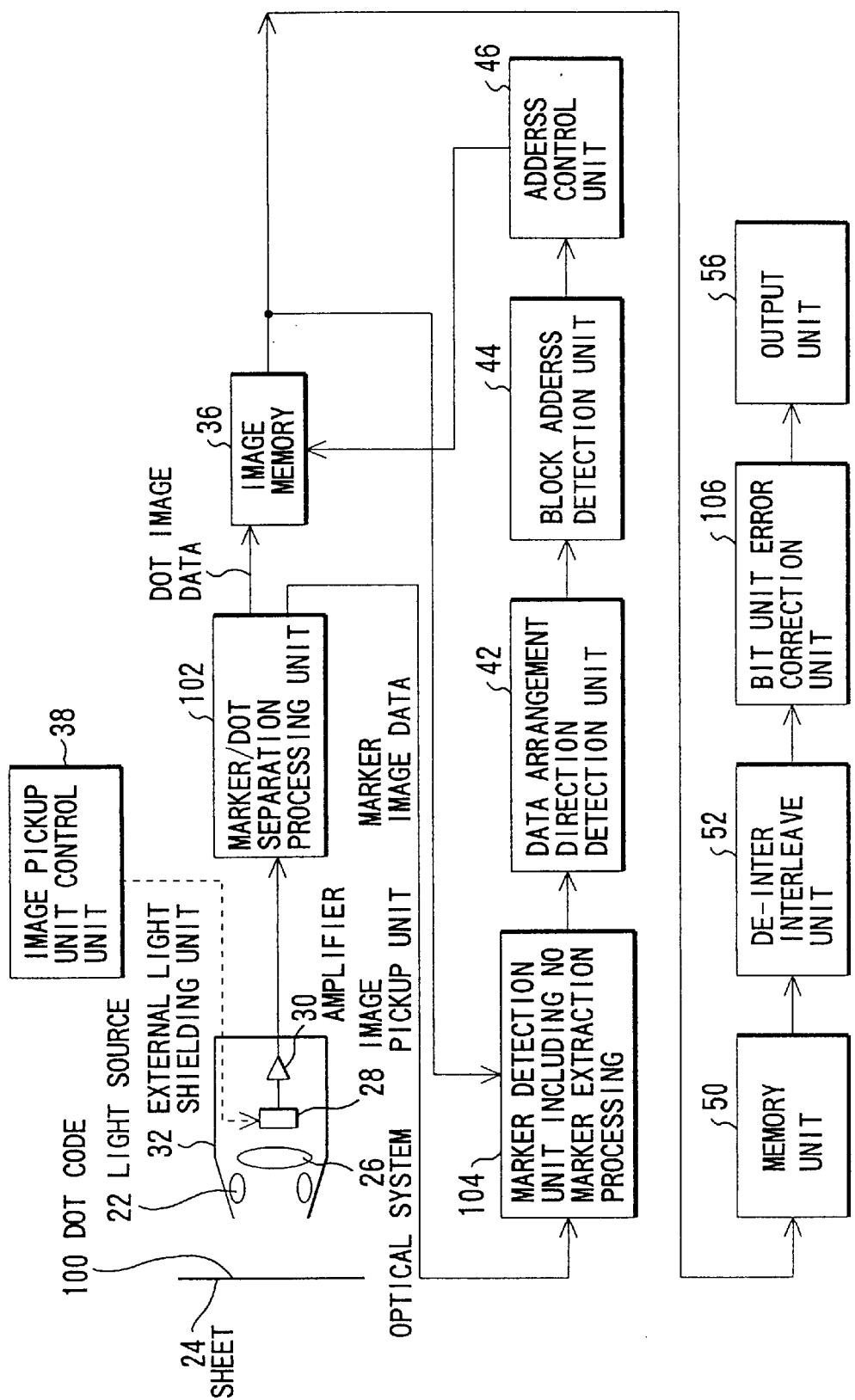
FIGS. 1B and 1C are block diagrams of information reproducing and recording systems for respectively reproducing and recording the dot code with the format shown in FIG. 1A.

FIG. 1B shows the arrangement of a reproducing system for reproducing the dot code 100 with the above-mentioned format.

In this embodiment, an image signal as an output from a pre-amplifier 30 is input to a marker/dot separation processing unit 102, and is separated into dot image data and marker image data.

The dot image data is input to an image memory 36, and the marker image data is input to a marker detection unit 104 which does not include any marker extraction processing and is arranged in place of a marker detection unit 40 including marker extraction in the previous application (U.S. Ser. No. 08/407,018, EP0670555A1).

The marker detection unit 104 detects markers 14 to read the pattern dots from the dot image data stored in the image memory 36 in accordance with the marker image data. Furthermore, the marker 14 may be detected from the marker image data only.

Thereafter, original multimedia information is reproduced and output in the same manner as in the apparatus of the previous application (U.S. Ser. No. 08/407,018, EP0670555A1).

In this case, since the data dots 84 are not modulated, no demodulation processing is required in this embodiment. Therefore, a demodulation unit 48 arranged between the image memory 36 and a memory unit 50 in the apparatus of the previous application (U.S. Ser. No. 08/407,018, EP0670555A1) can be omitted in this embodiment.

On the other hand, in de-interleave processing performed by a de-interleave unit 52, since information input to the memory unit 50 has a one-to-one correspondence with dot information, de-interleave processing may be performed in units of bytes, but is preferably performed in units of bits since the processed data can become stronger against burst errors.

Error correction of data is processed in units of bits by a bit unit error correction unit 106.

Figure 2A:
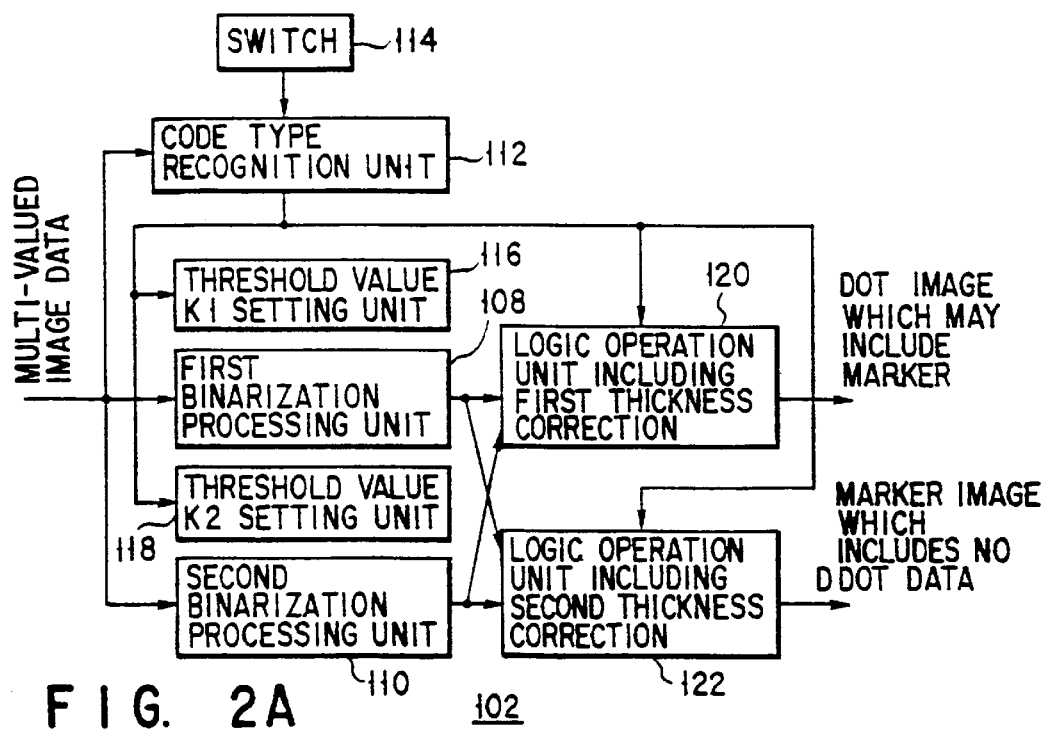
FIG. 2A is a block diagram showing the detailed arrangement of a marker/dot separation processing unit in FIG. 1A.

In the marker/dot separation processing unit 102 that separates an input image signal into dot image data and marker image data, as shown in FIG. 2A, an image signal output from the pre-amplifier 30, i.e., multi-valued image data is input to first and second binarization processing units 108 and 110, and a code type recognition unit 112.

The code type recognition unit 112 recognizes the type of dot code 100. With this unit 112, the information reproducing system of the above arrangement can cope with various other dot codes on which markers, data dots, and an information recording medium have arbitrary combinations of black, gray, and white other than the combination of the markers 14 (black), data "1" (gray) of the data dots 84 and the like, and the information recording medium, i.e., the sheet 24 (white) in this embodiment.

The code type recognition unit 112 recognizes the type of code on the basis of the operation state of a switch 114 which is manually operated by a user, who has observed the dot code 100 and has discriminated a type of each dot code included the dot code 100, in accordance with his or her discrimination result.

The code type recognition unit 112 may automatically recognize the type of code.

For example, by calculating the histogram of an input multi-valued image, the type of code can be automatically recognized.

Figure 2B:
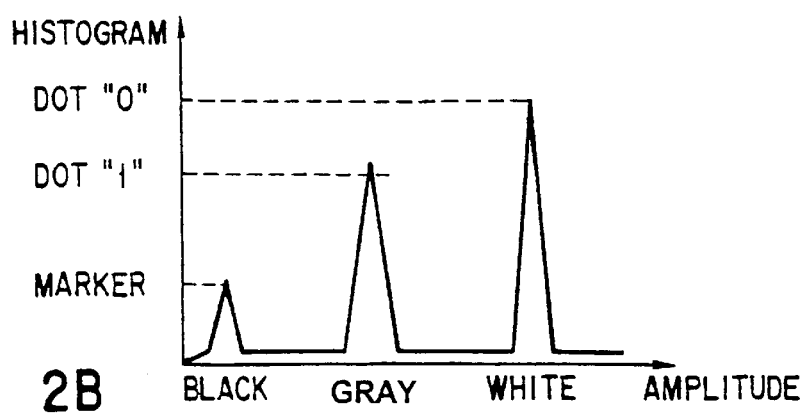
FIG. 2B is a graph for explaining the operation of a code type recognition unit in FIG. 2A.

More specifically, when the histogram of the dot code 100 with the format shown in FIG. 1A is calculated, the ratios of black, gray, and white are obtained, as shown in FIG. 2B. As can be seen from FIG. 2B, the color of the markers 14 having the smallest ratio in the entire dot code is black.

Likewise, as can be seen from FIG. 2B, as for the data dots 84 and the like, the color of data "0", which has the same color as that of the information recording medium, i.e., the sheet 24 having the highest ratio since it is transparent, is white as the background color of the information recording medium, i.e., the sheet 24.

Also, as can be seen from FIG. 2B, the color of data "1" which has a slightly smaller area than that of data "0" since it has a circular shape is gray.

In this case, dots "1" and "0" may be distinguished from each other by recognizing the dot shape or the like.

Information of the recognized code type is input from the code type recognition unit 112 to a threshold value K1 setting unit 116 and a threshold value K2 setting unit 118, and threshold values K1 and K2 are determined in correspondence with the input code type.

Using these threshold values K1 and K2, the first and second binarization processing units 108 and 110 binarize the multi-valued image data input from the pre-amplifier 30.

More specifically, when images of the marker 14 and pattern dots 80 are read out from an image pickup unit 28 such as a CCD, as indicated by an arrow in FIG. 3A, a multi-valued image signal having waveforms as shown in FIG. 3B is input from the pre-amplifier 30 to the first and second binarization processing units 108 and 110.

Furthermore, FIG. 3A shows image pickup data of the code, the arrow in FIG. 3A shows a position and a direction of the image pickup.

More specifically, in the multi-valued signal, black of the marker 14 is obtained as a low-level portion since it has a low reflectance, white of data "0" is obtained as a high-level portion, and gray of data "1" is obtained as a middle-level portion.

When such image signal is binarized with the threshold value K1 set by the threshold value K1 setting unit 116 by the first binarization processing unit 108, dot image signal including a marker is obtained, as shown in FIG. 3C.

On the other hand, when the image signal is binarized with the threshold value K2 set by the threshold value K2 setting unit 118 by the second binarization processing unit 110, a marker image signal including no dot data is obtained, as shown in FIG. 3D.

The output signals from these first and second binarization processing units 108 and 110 are respectively input to logic operation units 120 and 122 including first and second thickness correction functions.

The logic operation units 120 and 122 including the first and second thickness correction functions execute arithmetic operations in correspondence with the code type information supplied from the code type recognition unit 112.

In the case of the dot code 100 with the format of this embodiment, as shown in FIG. 1A, the logic operation unit 120 including the first thickness correction function directly outputs the output signal from the first binarization processing unit 108 as dot image data, and the logic operation unit 122 including the second thickness correction function directly outputs the output signal from the second binarization processing unit 110 as marker image data.

Note that the operations of the logic operation units 120 and 122 including the first and second thickness correction functions for various other dot codes will be explained in the following other embodiments to be described later.

Error correction in units of bits by the bit unit error correction unit 106 will be described below.

When dots each having a diameter of about 40 fm are recorded on the sheet 24 as the information recording medium, instead of burst errors positionally scattered errors in units of dots may be generated due to deformation from the expected dot shape, peeling, or attachment of fine paper dust.

For example, when a dot code is printed on a high-quality paper sheet, the error rate of erroneous reading in units of dots in a system for reproducing recorded dots is about $10^{-3}$ (0.1%).

Figure 13A:
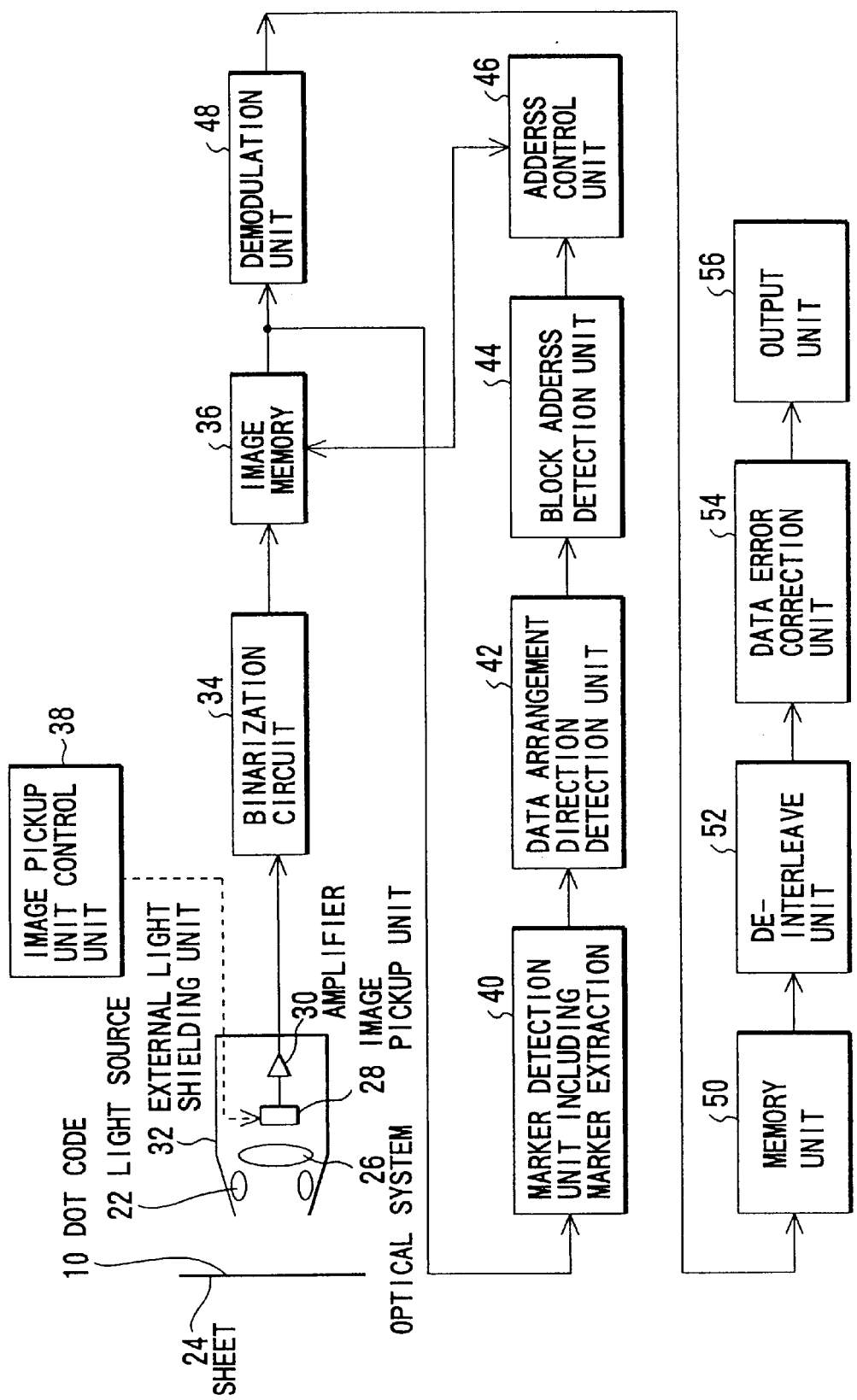
FIGS. 13A and 13B are block diagrams of information reproducing and recording systems for respectively reproducing and recording the dot code of the previous application.
Figure 13B:
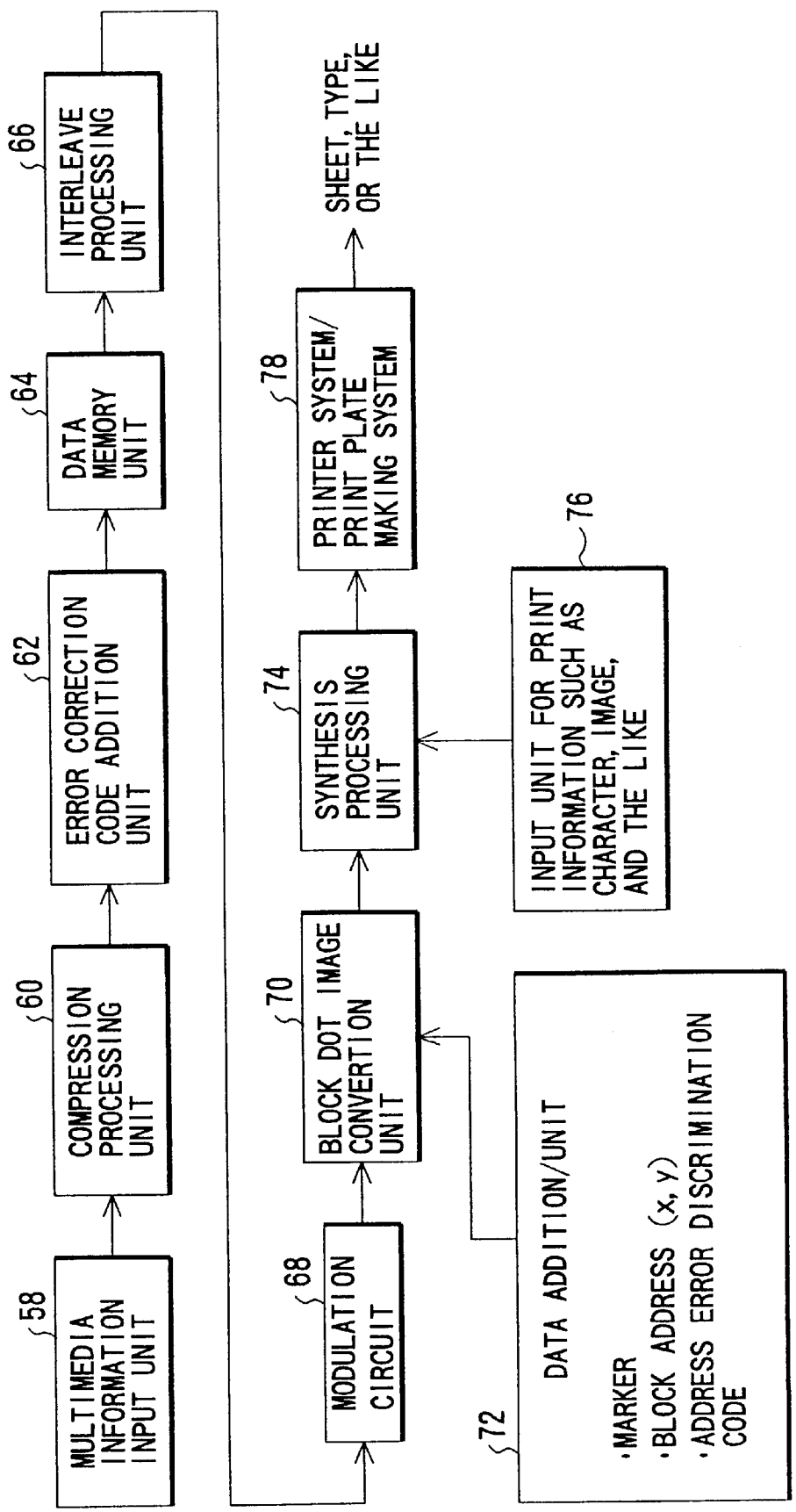

On the other hand, in a system which performs 10–8 demodulation and error correction in units of bytes as in the arrangement shown in FIG. 13A of the previous application (U.S. Ser. No. 08/407,018), a 1-dot error becomes equivalent to a 1-byte error, and the bit unit error rate of $10^{-3}$ (0.1%) becomes equivalent to a byte unit error rate of $10^{-2}$ (1%).

FIG. 3E is a graph showing the correction performance of the error correction processing.

This graph shows the error correction performance of a (272, 200) BCH code, the abscissa plots the input error rate, and the ordinate plots the error rate after correction.

When error correction is performed using this error correction method in units of bytes, and when the input byte error rate is $10^{-2}$ (1%), the output error rate becomes about $3 \times 10^{-3}$ (0.3%), as indicated by a curve (A) in the graph of FIG. 3E.

On the other hand, in the arrangement of this embodiment shown in FIG. 1B, when error correction is performed in units of bits, since the input bit error rate is $10^{-3}$ (0.1%), the output error rate becomes about $10^{-10}$ ($10^{-8}$%).

If the input data amount per scan is data for 1K dots, the case that can not completely correct the error is generated once per about $10^7$ scans in the error correction in units of bits.

On the other hand, in the error correction in units of bytes, since the input data amount of 1K dots corresponds to 100 bytes, the case that can not completely correct the error is generated three times per about 10 scans.

If the required error correction code amount remains the same upon generation of positionally scattered errors in units of dots, the system that performs error correction of a non-modulated code in units of bits, as shown in FIG. 1B, can greatly improve error correction performance as compared to the system that performs 10–8 demodulation and error correction in units of bytes, as shown in FIG. 13A, in the previous application (U.S. Ser. No. 08/407,018, EP0670555A1).

If the arrangements shown in FIGS. 13A and 1B perform error correction having the same error correction performance using the (272, 200) BCH code error correction as described above, when the arrangement shown in FIG. 1B performs error correction in units of bits by the bit unit error correction unit 106 having error correction performance indicated by a curve (B) in the graph of FIG. 3E, the input bit error rate is $10^{-3}$ (0.1%), and the output error rate becomes about $3\times10^{-4}$ (0.03%). In addition, the error correction code amount of the bit unit error correction can be smaller than that of the (272, 200) BCH code.

Figures 4A, 4B:
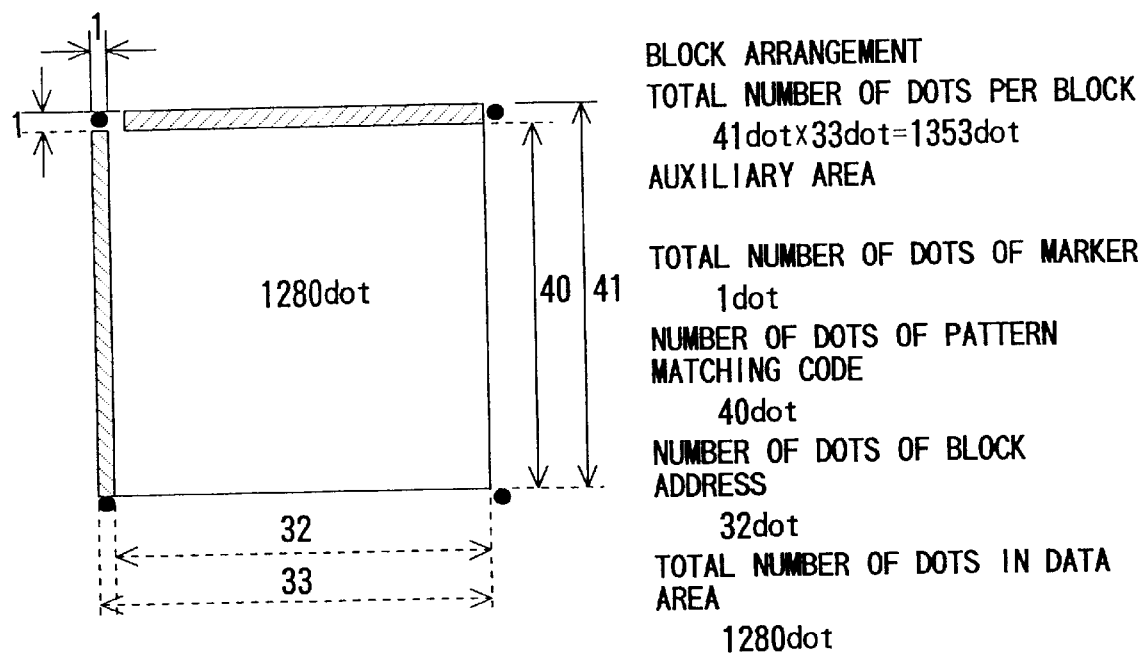
FIG. 4A is a table for comparing dot code redundancies in the previous application without error correction and in the first embodiment of the present invention.
FIG. 4B is a view for explaining the size of a block in the dot code according to the first embodiment of the present invention.

FIG. 4A shows a comparison result of the redundancies of the previous application (U.S. Ser. No. 08/571,776, EP0717398A1) and the present invention. The present invention can realize an efficient code with a small redundancy and a reproducing system therefor by the above-mentioned effect of error correction in units of bits with respect to that in units of bytes.

More specifically, in the present invention, when markers 14 and other dots are recorded to have the same dot size and the total number of dots per block is 1,353 dots (=33 dots×41 dots) as in the previous application (U.S. Ser. No. 08/571,776, EP0717398A1), each marker 14 uses a region of 1 dot×1 dot, the pattern dots 80 use a region of 1 dot×40 dots, and the address dots 82 use a region of 32 dots×1 dot, as shown in FIG. 4B.

Therefore, in this embodiment, the actual data area can have a size of 1,280 dots by excluding 1 dot+40 dots+32 dots=73 dots from the total number of dots since it corresponds to a portion except for the markers 14, the pattern dots 80, and the address dots 82. In addition, since data to be recorded on this data area is not modulated, all these 1,280 dots can serve as effective dots in practice.

More specifically, only the 73 dots are redundant dots, and this embodiment can suppress the redundancy to 5.4% (=73/1,353) which is very much smaller than the (30%) according to the technique disclosed in previous application (U.S. Ser. No. 08/571,776, EP0717398A1).

As described above, in this embodiment, since markers are recorded using a color different from other dots, even when the markers 14 have the same size as that of other dots, the markers 14 can be reliably detected, and the reading reference points for the data dots 84 can be determined. Therefore, original multimedia information can be accurately reproduced and output.

Figure 1C:
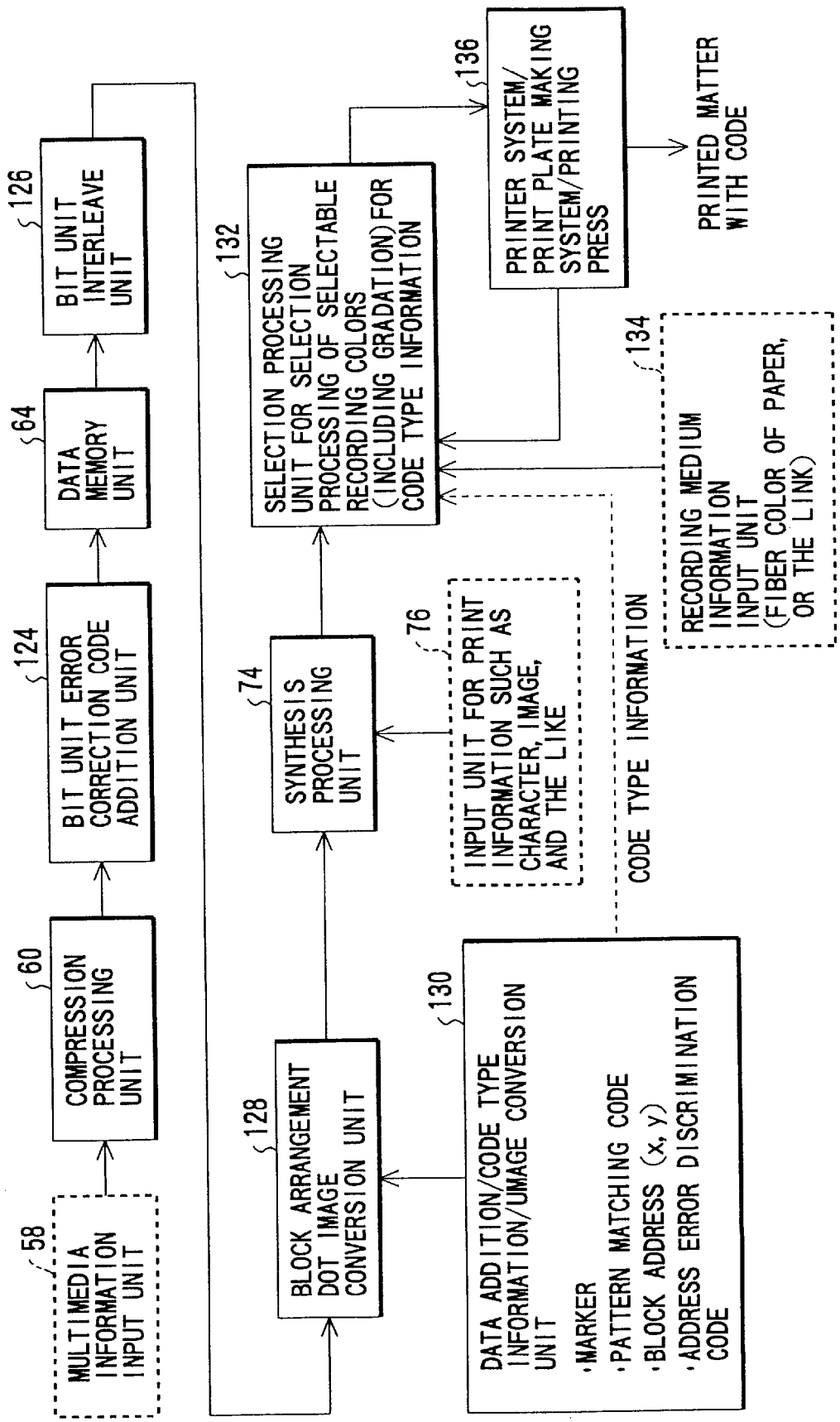

Note that a recording system for recording the dot code 100 with the format shown in FIG. 1A has an arrangement, as shown in FIG. 1C.

More specifically, in this embodiment, multimedia information from a multimedia information input unit 58 is compressed by a compression processing unit 60, and error correction codes in units of bits are added to the compressed data in a bit unit error correction code addition unit 124. Thereafter, the data is written in a data memory unit 64.

The data is then subjected to interleave processing in units of bits in a bit unit interleave unit 126.

Note that the bit unit error correction code addition unit 124 need not always add error correction codes in units of bits but may add error correction codes in units of bytes.

The data as a result of the interleave processing is converted by a block arrangement dot image conversion unit 128 into dot image data.

Furthermore, in this stage, the image data does not include information regarding colors and gradation.

At this time, a data addition/code type information/image conversion unit 130 converts markers, pattern matching codes, block addresses, and address error discrimination codes (CRC or the like) into image data so as to add them to the dot image data.

The output image data from the block arrangement dot image conversion unit 128 may be recognized each of the result of the interleave, markers, pattern matching codes, block addresses, and address error discrimination codes.

The dot images are synthesized by a synthesis processing unit 74 with print information (e.g., an image, a title, characters, and the like) to be recorded on the information recording medium from a print information input unit 76, and the synthesized image data is supplied to a selection processing unit 132 for performing selection processing of selectable recording colors (including gradation) for the code type information.

The selection processing unit 132 for performing selection processing of selectable recording colors for the code type information also receives the code type information indicating a code type, i.e., type information indicating colors and gradation levels from the data addition/code type information/image conversion unit 130, recording medium information indicating, e.g., the fiber color of paper as information of the information recording medium itself input from a recording medium information input unit 134 by means of a user's manual operation or automatic recognition, and printable color information from a printer system/print plate making system/printer 136. Then, the selection processing unit 132 separates the recording colors of the markers and dots to white, gray, black, and the like in accordance with the received information, and the dot code 100 is printed on the information recording medium by the printer system/print plate making system/printer 136.

The second embodiment of the present invention will be described below.

In this embodiment, as shown in FIG. 5A, markers 14 are white, data "1" of pattern, address, and data dots 80, 82, and 84 are black, data "0" thereof are transparent, and an information recording medium (sheet 24) is gray.

In the dot code with the above-mentioned format, when images of the markers 14 and the pattern dots 80 are read out from the image pickup unit 28 such as a CCD, as indicated by an arrow in FIG. 5B, using the reproducing system with the arrangement as shown in FIG. 1B, a multi-valued image signal as shown in FIG. 5C is input to the first and second binarization processing units 108 and 110 via the pre-amplifier 30.

When such image data is binarized with the threshold value K1 set by the threshold value K1 setting unit 116 in the first binarization processing unit 108 shown in FIG. 2A, a dot image signal shown in FIG. 5D is obtained.

On the other hand, when the image signal is binarized with the threshold value K2 set by the threshold value K2 setting unit 118 in the second binarization processing unit 110 shown in FIG. 2A, and the binary data is inverted by the logic operation unit 122 including the second thickness correction function, a marker image signal including no dot data components is obtained, as shown in FIG. 5E.

In this case, the marker image data is inverted, so that the marker detection unit 104 (FIG. 1B) including no marker extraction processing can perform the same processing as in the first embodiment.

The third embodiment of the present invention will be described below.

In this embodiment, as shown in FIG. 6A, markers 14 are gray, data "1" of pattern, address, and data dots 80, 82, and 84 are black, data "0" thereof are transparent, and an information recording medium (sheet 24) is white.

In the dot code with the above-mentioned format, when images of the markers 14 and the pattern dots 80 are read out from the image pickup unit 28 such as a CCD, as indicated by an arrow in FIG. 6B, using the reproducing system with the arrangement as shown in FIG. 1B, multi-valued image data is input to the marker/dot separation processing unit 102 via the pre-amplifier 30.

FIG. 7A is a block diagram showing the arrangement of the marker/dot separation processing unit 102 of this embodiment.

More specifically, in this marker/dot separation processing unit 102, the multi-valued image signal output from the pre-amplifier 30 is input to the first and second binarization processing units 108 and 110.

In the first binarization processing unit 108, when input image data is binarized with the threshold value K1 set by the threshold value K1 setting unit 116, a dot image signal including no markers is obtained, as shown in FIG. 6D.

The output from the first binarization processing unit 108 is supplied to both the logic operation units 120 and 122 including first and second thickness correction processing functions.

In this case, the logic operation unit 120 including the first thickness correction processing function directly outputs the input signal as dot image data.

On the other hand, in the second binarization processing unit 110, input image data is binarized with the threshold value K2 set by the threshold value K2 setting unit 118.

With this processing, an image signal including both markers and dots is obtained, as shown in FIG. 6E.

At this time, a marker image signal indicating only a marker is not extracted yet.

In this embodiment, the output signal form the second binarization processing unit 110 is supplied to the logic operation unit 122 including the second thickness correction processing function.

In the logic operation unit 122 including the second thickness correction processing function, a logic operation unit 122A EX-ORs the image signal shown in FIG. 6D as the output signal from the first binarization processing unit 108, and the image signal shown in FIG. 6E as the output signal from the second binarization processing unit 110.

With this processing, an image signal shown in FIG. 6F is obtained.

Impulse-shaped signal components in the image signal shown in FIG. 6F are generated when the widths of dot portions slightly vary in the signals shown in FIGS. 6D and 6E since the multi-valued signal shown in FIG. 6C becomes blunt.

Therefore, in the logic operation unit 122 including the second thickness correction processing function, the output from the logic operation unit 122A is subjected to erosion processing as processing for eroding low-level signal portions of an input signal or low-pass filter processing, i.e., processing for removing impulse-shaped signal components in an erosion processing/low-pass filter processing unit 122B, thereby obtaining an image signal indicating only a marker, as shown in FIG. 6G. This signal is supplied as marker image data to the marker detection unit 104 including no marker extraction processing.

In this embodiment, the marker/dot separation processing unit 102 may have an arrangement shown in FIG. 7B.

That is, the logic operation unit 122 including the second thickness correction processing function is arranged so that the output from the first binarization processing unit 108 is input to the logic operation unit 122A via a dilation processing unit 122C, and the output from the second binarization processing unit 110 is directly input to the logic operation unit 122A.

The dilation processing unit 122C performs dilation processing for dilating low-level signal portions of an input signal, and the logic operation unit 122A performs the logic operation by combination of NOT, AND to the two input signals.

The logic operation unit 122 including the second thickness correction processing function outputs marker image data shown in FIG. 6G by EX-ORing a signal obtained by dilating low-level signal portions of the signal shown in FIG. 6D by the dilation processing unit 122C, and the signal shown in FIG. 6E.

The dot code formats described in the first and second embodiments require neither thickness correction such as erosion or dilation processing nor logic operations, and marker extraction can be attained by simple binarization processing.

On the other hand, the format of the third embodiment is strong against noise since data dots are black and white and have a large noise margin, i.e., dynamic range.

In addition to the dot code formats of the first to third embodiments, various other combinations for recording markers 14, dots "1" and "0" of pattern, address, and data dots 80, 82, and 84, and an information recording medium to have different predetermined reflectances or transmittances are available.

FIG. 8 summarizes such combinations.

In FIG. 8, an open circle indicates white with a high reflectance, a full circle indicates black with a low reflectance, a double circle indicates gray with a middle reflectance, and a square indicates transparent.

In these combinations, type No. 5 corresponds to the format of the first embodiment shown in FIG. 1A, type No. 7 corresponds to the format of the second embodiment shown in FIG. 5A, and type No. 22 corresponds to the format of the third embodiment shown in FIG. 6A.

When an information recording medium is transparent, the markers 14 and the information recording medium (sheet 24) are difficult to discriminate from each other. For reason, some measures must be taken, the surrounding portion of a marker 14 may be recorded in a color different from that of the marker 14 to have a different reflectance, for example.

Dots such as data dots 84 and the like are reproduced by equally dividing portions among four detected markers.

Therefore, even when an information recording medium is transparent, dots can be reliably reproduced as long as markers 14 are extracted. For this reason, a measure need only be taken for the markers 14 so that the markers 14 and the information recording medium (sheet 24) can be discriminated from each other.

The fourth embodiment of the present invention will be described below.

In the first to third embodiments described above, a dot code is recorded on an information recording medium by recording dots in gray, i.e., dots having a middle reflectance in addition to black and white dots. However, in this embodiment, dots are color-recorded.

For example, a thermal transfer or sublimation printer, or the like uses three primary colors, cyan, yellow, and magenta.

Figure 9A:
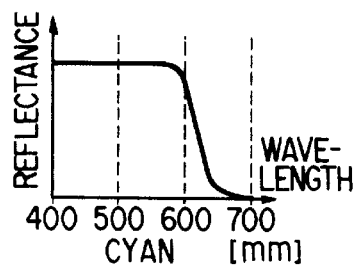
FIGS. 9A to 9C are graphs showing the cyan, yellow, and magenta wavelength characteristics.
Figure 9B:
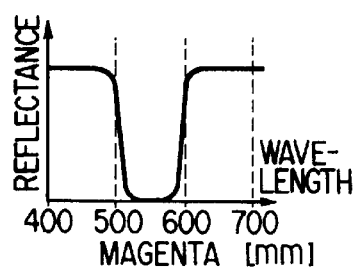
Figure 9C:
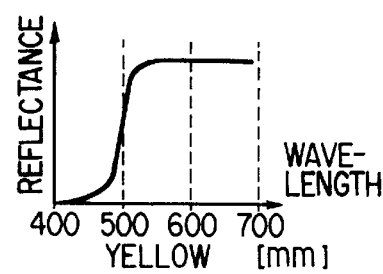

The wavelength characteristics of these colors are as shown in FIGS. 9A to 9C.

More specifically, FIG. 9A shows the cyan characteristics, FIG. 9B shows the magenta characteristics, and FIG. 9C shows the yellow characteristics. In each of these graphs, the abscissa plots the wavelength (nm) in the visible range, and the ordinate plots the reflectance.

In this embodiment, in place of gray, for example, dots corresponding to dots "1" in the format shown in FIG. 1A are recorded using cyan ink.

Figure 9D:
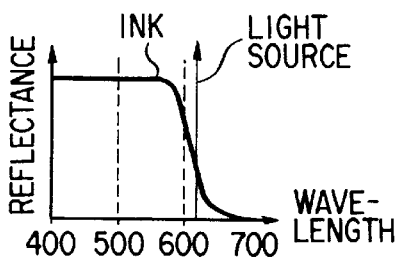
FIGS. 9D, 9E, and 9H are graphs showing the wavelength characteristics of various light sources in correspondence with the cyan wavelength characteristics.

In a reproducing system in this case, the light source 22 in FIG. 1B comprises the one having a wavelength corresponding to a portion where the reflectance changes, i.e., having middle reflectance characteristics, as indicated by an arrow (its length represents the luminance level) in the graph of FIG. 9D showing the wavelength characteristics of cyan ink. Thus, cyan dots can be reproduced as those having a middle gradation level.

Figure 9F:
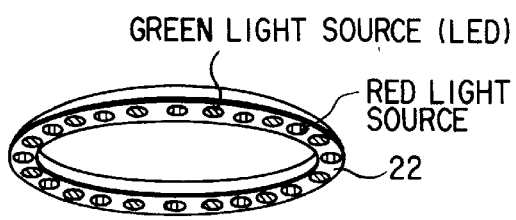
FIGS. 9F, 9G, and 9I are views showing examples of light sources.
Figure 9E:
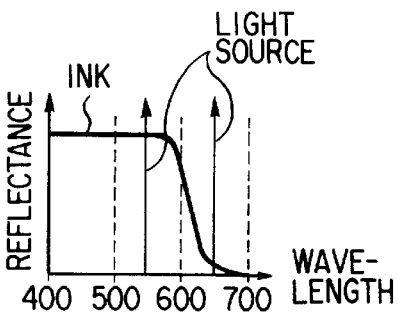

Alternatively, as shown in FIG. 9E, illumination may be made using two wavelength components.

In this case, the light source 22 can be constituted by alternately arranging green light sources (LEDs) and red light sources (LEDs) in a ring pattern, as shown in FIG. 9F.

With this arrangement, cyan dots can be reproduced as those having a middle gradation level with respect to the white information recording medium (sheet 24).

Figure 9G:
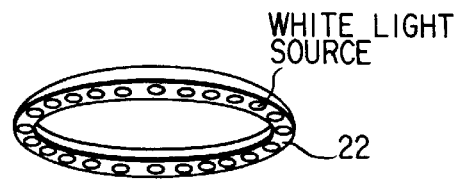

When dots are recorded using such cyan ink, the light source 22 may comprise a white light source, as shown in FIG. 9G.

Figure 9H:
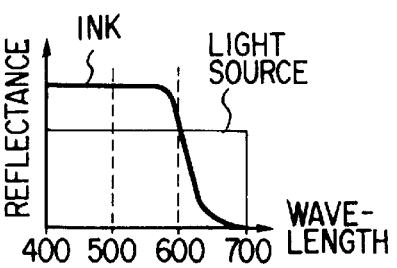

The white light source exhibits uniform characteristics in the visible range, as shown in FIG. 9H.

In this case as well, dots recorded by cyan ink can be reproduced as those having a middle gradation level.

Using the above-mentioned light source, dots recorded using cyan ink can be reproduced as those having a middle gradation level.

As the ink, magenta or yellow ink may be used in place of cyan ink.

More specifically, when a light source having two color components, i.e., wavelengths, as shown in FIG. 9F, is used, if it is constituted by two light source elements having low- and high-reflectance components, either magenta or yellow dots can be reproduced as those having a middle gradation level.

Furthermore, in place of cyan, yellow, and magenta inks, red, blue, and yellow inks may be used upon recording.

Figure 9I:
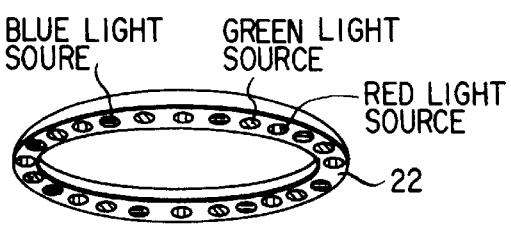
Figure 12:
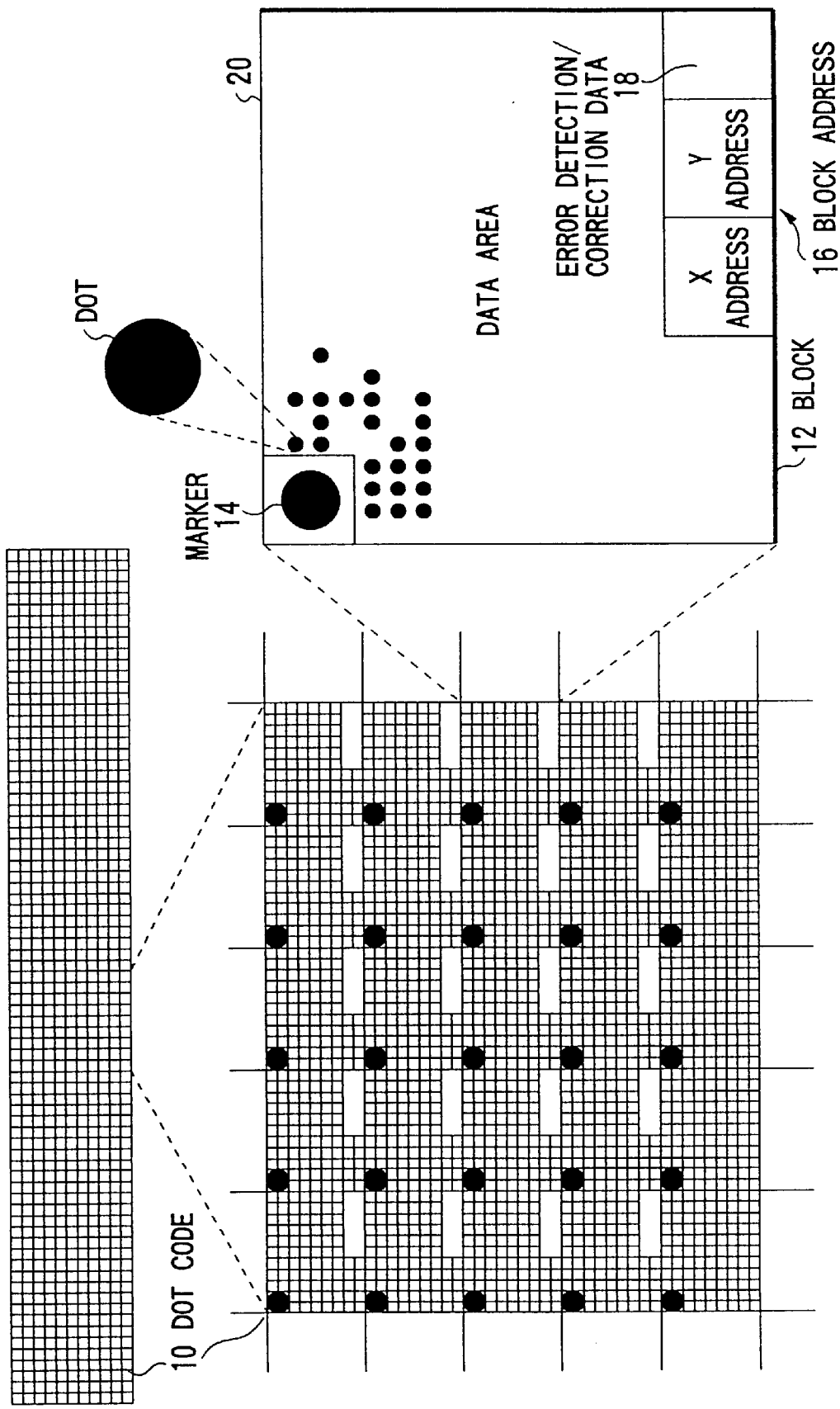
FIG. 12 is a view showing the format of a dot code of the previous application.

In this case, when the light source 22 consisting of blue, green, and red light source elements is used, as shown in FIG. 9I, dots recorded using any of cyan, magenta, yellow, red, green, and yellow inks can be reproduced as those with a middle gradation level as in the white light source shown in FIG. 9G.

Note that the light source may be constituted by a white light source and a color filter. The color filter is arranged in the optical path between the image pickup unit and the code, and may be switched for each image pickup operation.

The fifth embodiment of the present invention will be described below.

More specifically, in the first to third embodiments, pattern dots 80, address dots 82, and data dots 84 as a dot code recorded on an information recording medium are recorded in the same color. However, in this embodiment, as shown in FIG. 10A, the pattern dots 80 and the address dots 82 are recorded in black as in markers 14, and dots "1" of the data dots 84 are recorded in gray.

In the dot code format, i.e., ideally, as shown in FIG. 10B, dots are recorded to regularly contact each other. However, in practice, as shown in FIG. 10C, dots tend to swell due to the limited performance of printing presses or printers.

When dots swell, if a gray or white dot overlaps a black dot, the overlapping portion turns black, and the gray or white dot is erroneously recognized as a black dot, thus causing data reproduction errors.

In view of this problem, in this embodiment, information such as pattern and address dots 80 and 82, which are important for reproduction, are recorded in black, thereby eliminating reproduction errors.

The sixth embodiment of the present invention will be described below.

In this embodiment, the fifth embodiment is attained using color dots.

That is, in this embodiment, as shown in FIG. 11A, dots "1" are recorded in magenta, and dots "0" are recorded in yellow.

In the dot code with the above format, when images of markers 14 and pattern dots 80 are read out from the image pickup unit 28 such as a CCD, as indicated by an arrow in FIG. 11A, using the reproducing system with the arrangement shown in FIG. 1B, multi-valued image data shown in FIG. 11B is input to the first and second binarization processing units 108 and 110 via the pre-amplifier 30.

In the first binarization processing unit 108 shown in FIG. 2A, when such image data is binarized with the threshold value K1 set by the threshold value K1 setting unit 116, dot image data including a marker is obtained, as shown in FIG. 11C.

In the second binarization processing unit 110, when the image data is binarized with the threshold value K2 set by the threshold value K2 setting unit 118, marker image data including no dot data is obtained, as shown in FIG. 11D.

The combination of colors is not limited to that of yellow and magenta. For example, two of cyan, yellow, and magenta may be used in various other combinations, or two of red, blue, and yellow may be used in various combinations.

On the other hand, markers 14 may be recorded as color dots, and dots "1" may be recorded as black ones. More specifically, for markers and dots "0" and "1", a combination of colors having different wavelength characteristics or a combination of black and gray inks with different reflectances may be used.

The present invention has been described with reference to its embodiments. However, the present invention is not limited to the above-mentioned embodiments, and various modifications and applications may be made within the scope of the invention.

The scope of the present invention will be summarized below.

(1) An information recording medium on which multimedia information including at least one of audio information, image information, and text data is recorded as an optical readable code, is characterized in that the code is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, and the dots of the data dot pattern and the markers are recorded on the information recording medium so that the dots, the markers, and the information recording medium have different predetermined reflectances or transmittances.

More specifically, upon optically reading the recorded code, the marker, dots, and information recording medium can be easily separated on the basis of their reflected light amounts or transmitted light amounts, the area required for the marker can be reduced, data need not be modulated, and the ratio of data in the code recording area can be increased.

(2) The information recording medium described in (1) is characterized in that the data dot pattern is a non-modulated code, and is added with error correction codes in units of predetermined numbers of bits.

More specifically, in addition to the effect of (1), in particular, the redundancy with respect to the recording area due to modulation can be eliminated, the amount of error correction codes to be added can be small, and the ratio of data in the code recording area can be increased.

(3) The information recording medium described in (1) is characterized in that the dots of the data dot pattern and the marker are recorded to have the same size.

More specifically, in addition to the effect of (1), in particular, the area required for the marker can be reduced, data need not be modulated, and the ratio of data in the code recording area can be increased.

Also, the dot recording size and the dot pitch of the recording apparatus can be fixed.

(4) The information recording medium described in (1) is characterized in that the dots of the data dot pattern and the marker are recorded in different colors.

More specifically, in addition to the effect of (1), a printing press, a printer, or the like often records data using a plurality of colors, and dots and the like can be easily recorded using the plurality of colors.

(5) The information recording medium described in (4) is characterized in that the dots of the data dot pattern and the marker are recorded to have different luminance levels.

More specifically, in addition to the effect of (4), a monochrome (including gray) printing press, printer, or the like can easily record dots and the like using gray. The number of colors to be used is smaller than color recording, thus allowing low-cost, easy recording.

(6) The information recording medium described in (5) is characterized in that the dots of the data dot pattern are recorded in gray, and the marker is recorded in black.

More specifically, in addition to the effect of (5), even when a marker and a dot overlap each other due to deformation or swelling, the marker as important information can be reliably detected. Also, the marker can be easily extracted.

(7) The information recording medium described in (6) is characterized in that the code further comprises, in addition to the marker, a pattern matching code for determining a reference position required for reading the dot pattern together with the marker, and an address code indicating an address of the block, and the pattern matching code and the address code are also recorded in black.

More specifically, the code including at least one of the pattern matching code and the block address code used for detecting a reference index serving as an approximate reference for detection, and a true reference can be reliably detected.

(8) The information recording medium described in (5) is characterized in that the dots of the data dot pattern are recorded in black, and the marker is recorded in gray.

More specifically, in addition to the effect of (5), in particular, upon detection of the dot pattern as information including many dots, black is hardly influenced by noise, and dots can be reliably detected.

(9) The information recording medium described in (5) is characterized in that the dots of the data dot pattern are recorded in black, and the marker is recorded in white.

More specifically, in addition to the effect of (5), in particular, the marker and dots can be easily separated.

(10) The information recording medium described in (9) is characterized in that the information recording medium is gray.

More specifically, in addition to the effect of (9), dots indicating the "0" and "1" states can be reliably discriminated from each other.

(11) The information recording medium described in (1) is characterized in that the dots of the data dot pattern and the marker have different sizes.

More specifically, in addition to the effect of (1), the dots and marker can be reliably discriminated from each other, and the code is strong against noise.

(12) The information recording medium described in (4) is characterized in that the dots of the data dot pattern, the marker, and the information recording medium are in black, white, and a color different from black and white.

More specifically, in addition to the effect of (4), since a color such as cyan, yellow, magenta, or the like is used as the color different from black and white, the code can be recorded with low cost using a normal color printing press or printer.

(13) The information recording medium described in (1) to (12) is characterized in that the dots of the data dot pattern includes dots indicating a "0" state and dots indicating a "1" state, and the dots are recorded to have different reflectances or transmittances.

More specifically, in addition to the effects of (1) to (12), the "0" and "1" states of dots can be reliably discriminated from each other.

(14) An information reproducing system which comprises reading means for reading, from an information recording medium on which multimedia information including at least one of audio information, image information, and text data is recorded as an optical readable code, the code by optical scanning, processing means for restoring the multimedia information by processing the code read by the reading means, and output means for reproducing and outputting the information on the basis of an output signal from the processing means, is characterized in that the code recorded on the information recording medium is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, and the processing means comprises separation means for separating the marker using first and second threshold values so as to discriminate the dots of the data dot pattern, the marker, and the information recording medium from each other from the code read by the reading means.

More specifically, the following code can be reproduced. That is, with this code, upon optically reading the recorded code, the marker, dots, and information recording medium can be easily separated on the basis of their reflected light amounts or transmitted light amounts, the area required for the marker can be reduced, data need not be modulated, and the ratio of data in the code recording area can be increased. In addition, the dots and marker can be separated by a simple device, and a low-cost, space-saving apparatus can be realized.

(15) The information reproducing system described in (14) is characterized in that the dots of the data dot pattern, the marker, and the information recording medium are in black, white, and a color different from black and white, and the reading means reads the code on the information recording medium using a light source having at least one type of wavelength characteristics determined by reflection characteristics or transmission characteristics of the dots of the data dot pattern and the marker.

More specifically, in addition to the effect of (14), upon reproducing the code of the information recording medium, on which dots of the data dot pattern, the marker, and the information recording medium are in black, white, and the color different from black and white, the dots and marker can be separated by a simple light source, and a low-cost, space-saving apparatus can be realized.

(16) The information reproducing system described in (14) is characterized in that the separation means further comprises code type recognition means for recognizing reflectances or transmittances of the dots of the data dot pattern, the marker, and the information recording medium by discriminating the dots of the data dot pattern, the marker, and the information recording medium from each other.

More specifically, in addition to the effect of (14), the code type recognition unit can recognize the relationship among the light receiving amounts of the reading means corresponding to the recording colors of the marker and the "0" and "1" states of the dots, thus allowing reproduction of a plurality of types of codes.

(17) The information reproducing system described in (14) is characterized in that the dots of the data dot pattern, the marker, and the information recording medium are in black, white, and a color different from black and white, and the reading means reads the code on the information recording medium using a light source having wavelength characteristics which can obtain different reflected light amounts or transmitted light amounts for three colors, black, white, and the color different from black and white.

More specifically, in addition to the effect of (14), upon reproducing the code of the information recording medium, on which dots of the data dot pattern, the marker, and the information recording medium are in black, white, and the color different from black and white, the code can be easily reproduced by a light source having at least one type of wavelength characteristics, and a low-cost, space-saving apparatus can be realized.

(18) An information reproducing system which comprises reading means for reading, from an information recording medium on which multimedia information including at least one of audio information, image information, and text data is recorded as an optical readable code, the code by optical scanning, processing means for restoring the multimedia information by processing the code read by the reading means, and output means for reproducing and outputting the information on the basis of an output signal from the processing means, is characterized in that the code is a non-modulated code, and the processing means performs error correction processing in units of predetermined numbers of bits.

More specifically, the following code can be reproduced. That is, the code is constituted by arranging a plurality of blocks, each block has a data dot pattern including a plurality of dots arranged in correspondence with the data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, the data dot pattern is a non-modulated code, and error correction codes are added in units of predetermined numbers of bits. Therefore, the error correction performance against random errors due to deformation of dots upon recording such as printing can be improved, and hence, the reproduction probability can be increased.

(19) An information recording system which comprises input means for inputting multimedia information including at least one of audio information, image information, and text data, conversion means for converting the multimedia information input by the input means into an optical readable code, and recording means for recording the code converted by the conversion means on an information recording medium so as to be optically readable, and in which the code is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, and the dots of the data dot pattern and the markers are recorded on the information recording medium so that the dots, the markers, and the information recording medium have different predetermined reflectances or transmittances, is characterized in that the conversion means comprises means for adding error correction codes in units of predetermined numbers of bits upon conversion of the multimedia information into the optical readable code, and data added with the error correction codes is non-modulated data.

More specifically, the following code can be recorded. That is, the code is constituted by arranging a plurality of blocks, each block has a data dot pattern including a plurality of dots arranged in correspondence with the data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, the data dot pattern is a non-modulated code, and error correction codes are added in units of predetermined numbers of bits.

(20) An information recording system which comprises input means for inputting multimedia information including at least one of audio information, image information, and text data, conversion means for converting the multimedia information input by the input means into an optical readable code, and recording means for recording the code converted by the conversion means on an information recording medium so as to be optically readable, and in which the code is constituted by arranging a plurality of blocks, each of the blocks comprises a data dot pattern including a plurality of dots arranged in correspondence with data contents, and a marker which is arranged to have a first predetermined positional relationship with respect to the data dot pattern and determines a reference position required for reading the dot pattern, and the dots of the data dot pattern and the markers are recorded on the information recording medium so that the dots, the markers, and the information recording medium have different predetermined reflectances or transmittances, is characterized in that the recording means comprises means for selecting colors or densities to be recorded on the information recording medium in correspondence with type information of the code and information associated with the information recording medium.

More specifically, the following code can be recorded. That is, the code is constituted by arranging a plurality of blocks, each block has a data dot pattern including a plurality of dots arranged in correspondence with the data contents, and a marker which is arranged to have a first predetermined positional relationship with respect to the data dot pattern and determines a reference position required for reading the dot pattern, the dots of the data dot pattern and the markers are recorded on the information recording medium so that the dots, the markers, and the information recording medium have different predetermined reflectances or transmittances, the data dot pattern is a non-modulated code, and error correction codes are added in units of predetermined numbers of bits. In addition, the recording colors of the marker and dots can be selected in correspondence with a recording machine such as a printer or a printing press, its print conditions, and the information recording medium, and the type of code can be determined.

Therefore, as described above, the present invention can provide an information recording medium which can reduce the code redundancy and can record more information on a smaller recording area, an information recording system for attaining such recording, and an information reproducing system which can accurately reproduce original multimedia information from such information recording medium.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An information recording medium on which multimedia information including at least one of audio information, image information, and text data is recorded as an optical readable code, wherein:

the code is constituted by arranging a plurality of blocks, each comprising: (i) a data dot pattern including a plurality of dots arranged in correspondence with data contents related to the multimedia information, (ii) a marker which is arranged to have a first predetermined positional relationship with respect to the data dot pattern, said marker determining a reference position required for reading the data dot pattern and having a size which is different from a size of the dots of the data dot pattern, and (iii) a block address dot representing an address of a block which is arranged to have a second positional relationship with is respect to the data dot pattern, the dots of the data dot pattern, the markers and the information recording medium have at least one of different predetermined reflectances and transmittances, the data dot pattern comprises a non-modulated code capable of including a data row corresponding to a data row of the marker, and has a predetermined data value and represents consecutive numbers.

2. A medium according to claim 1, wherein error correction codes in units of predetermined numbers of bits are added to the data dot pattern.

3. A medium according to claim 1, wherein the dots of the data dot pattern and the marker are different in color.

4. A medium according to claim 3, wherein the dots of the data dot pattern and the marker have different luminance levels.

5. A medium according to claim 4, wherein the dots of the data dot pattern are gray and the marker is black.

6. A medium according to claim 5, wherein the code further comprises, in addition to the marker, a pattern matching having a plurality of dots for determining a reference position required for reading the data dot pattern together with the marker, and wherein the pattern matching code is also black.

7. A medium according to claim 4, wherein the dots of the data dot pattern are black, and the marker is gray.

8. A medium according to claim 4, wherein the dots of the data dot pattern are black, and the marker is white.

9. A medium according to claim 8, wherein said information recording medium is gray.

10. A medium according to claim 3, wherein the dots of the data dot pattern are black, the marker is white, and the information recording medium is a color different from black and white.

11. A medium according to claim 1, wherein the dots of the data dot pattern include first dots indicating a "0" state and second dots indicating a "1" state, and the first and second dots have at least one of different reflectances and transmittances.

12. An information reproducing system comprising:

reading means for optically reading a code recorded on an information recording medium which represents multimedia information including at least one of audio information, image information, and text data;

processing means for restoring the multimedia information by processing the code read by said reading means; and output means for reproducing and outputting the information based on an output signal from said processing means, wherein the code recorded on the information recording medium comprises a plurality of blocks, each comprising: (i) a data dot pattern including a plurality of dots arranged in correspondence with data contents related to the multimedia information, (ii) a marker which is arranged to have a first predetermined positional relationship with respect to the data dot pattern, said marker determining a reference position required for reading the data dot pattern and having a size which is different from a size of the dots of the data dot pattern, and (iii) a block address dot representing an address of a block which is arranged to have a second positional relationship with respect to the data dot pattern, wherein the dots of the data dot pattern, the markers and the information recording medium have at least one of different predetermined reflectances and transmittances, wherein the data dot pattern comprises a non-modulated code capable of including a data row corresponding to a data row of the marker, and has a predetermined data value and represents consecutive numbers, and wherein said processing means comprises separation means for separating the marker from the code read by the reading means by use of first and second threshold values, so as to discriminate the dots of the data dot pattern, the marker, and the information recording medium from each other.

13. A system according to claim 12, wherein the the dots of the data dot pattern are black, the marker is white, and the information recording medium is a color different from black and white, and said reading means optically reads the code on the information recording medium using a light source having at least one type of wavelength characteristic determined by one of a reflection characteristic and a transmission characteristic of the dots of the data dot pattern and the marker.

14. A system according to claim 12, wherein said separation means further comprises code type recognition means for recognizing at least one of reflectances and transmittances of the dots of the data dot pattern, the marker, and the information recording medium by discriminating the dots of the data dot pattern, the marker, and the information recording medium from each other.

15. A system according to claim 12, wherein the the dots of the data dot pattern are black, the marker is white, and the information recording medium is a color different from black and white, and said reading means optically reads the code on the information recording medium using a light source having wavelength characteristics which provide different amounts of reflected light and transmitted light for black, white and the color different from black and white, respectively.

16. A system according to claim 12, wherein said processing means performs error correction processing in units of predetermined numbers of bits.

17. An information recording system comprising:

input means for inputting multimedia information including at least one of audio information, image information, and text data;

conversion means for converting the multimedia information input by said input means into an optical readable code; and recording means for recording the code converted by said conversion means on an information recording medium so as to be optically readable, wherein the code recorded on the information recording medium comprises a plurality of blocks, each comprising (i) a data dot pattern including a plurality of dots arranged in correspondence with data contents related to the multimedia information, (ii) a marker which is arranged to have a first predetermined positional relationship with respect to the data dot pattern, said marker determining a reference position required for reading the data dot pattern and having a size which is different from a size of the dots of the data dot pattern, and (iii) a block address dot representing an address of a block which is arranged to have a second positional relationship with respect to the data dot pattern, wherein the dots of the data dot pattern, the markers and the information recording medium have at least one of different predetermined reflectances and transmittances, wherein the data dot pattern comprises a non-modulated code capable of including a data row corresponding to a data row of the marker, and has a predetermined data value and represents consecutive numbers, wherein said conversion means comprises means for adding error correction codes to data associated with the multimedia information when the multimedia information is converted into the optical readable code to thereby perform error correction in units of a predetermined number of bits, and wherein the data to which the error correction codes are added includes a data row corresponding to a data row of the marker, and has a predetermined data value and represents consecutive numbers.

18. An information recording system comprising:

input means for inputting multimedia information including at least one of audio information, image information, and text data;

conversion means for converting the multimedia information input by said input means into an optical readable code; and recording means for recording the code converted by said conversion means on an information recording medium so as to be optically readable, wherein the code recorded on the information recording medium comprises a plurality of blocks, each comprising (i) a data dot pattern including a plurality of dots arranged in correspondence with data contents related to the multimedia information, (ii) a marker which is arranged to have a first predetermined positional relationship with respect to the data dot pattern, said marker determining a reference position required for reading the data dot pattern and having a size which is different from a size of the dots of the data dot pattern, and (iii) a block address dot representing an address of a block which is arranged to have a second positional relationship with respect to the data dot pattern, wherein the dots of the data dot pattern, the markers and the information recording medium have at least one of different predetermined reflectances and transmittances, wherein the data dot pattern comprises a non-modulated code capable of including a data row corresponding to a data row of the marker, and has a predetermined data value and represents consecutive numbers, and wherein said recording means comprises means for selecting one of colors and densities of the dots of the data dot pattern and the marker that are to be recorded on the information recording medium in correspondence with type information of the code and information associated with the information recording medium.

19. An information recording medium on which multimedia information including at least one of audio information, image information, and text data is recorded as an optical readable code, wherein the code recorded on the information recording medium comprises a plurality of blocks, each comprising (i) a data dot pattern including a plurality of dots arranged in correspondence with data contents related to the multimedia information, (ii) a marker which is arranged to have a first predetermined positional relationship with respect to the data dot pattern, said marker determining a reference position required for reading the data dot pattern and having a size which is different from a size of the dots of the data dot pattern, and (iii) a block address dot representing an address of a block which is arranged to have a second positional relationship with respect to the data dot pattern, wherein the dots of the data dot pattern, the markers and the information recording medium have at least one of different predetermined reflectances and transmittances, and wherein each of the dots of the data dot pattern and the marker are equal in size and shape.

\* \* \* \* \*